(12) United States Patent
Matsui et al.

(10) Patent No.: US 10,381,859 B2
(45) Date of Patent: Aug. 13, 2019

(54) WIRELESS POWER SUPPLY SYSTEM, POWER TRANSMITTER, AND POWER TRANSMISSION METHOD

(71) Applicant: FUJITSU LIMITED, Kawasaki-shi, Kanagawa (JP)

(72) Inventors: Kiyoto Matsui, Miki (JP); Akiyoshi Uchida, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 145 days.

(21) Appl. No.: 15/697,949

(22) Filed: Sep. 7, 2017

(65) Prior Publication Data

US 2017/0366034 A1 Dec. 21, 2017

Related U.S. Application Data

(63) Continuation of application No. PCT/JP2015/057841, filed on Mar. 17, 2015.

(51) Int. Cl.
 *H02J 7/02* (2016.01)
 *H02J 7/00* (2006.01)
 (Continued)

(52) U.S. Cl.
 CPC ............... *H02J 7/025* (2013.01); *H02J 7/00* (2013.01); *H02J 50/12* (2016.02); *H02J 50/40* (2016.02); *H02J 50/80* (2016.02); *H04B 5/0037* (2013.01)

(58) Field of Classification Search
 CPC ............ H02J 7/025; H02J 50/12; H02J 50/80
 (Continued)

(56) References Cited

U.S. PATENT DOCUMENTS 8,290,531 B2 * 10/2012 Wakamatsu ............ G06F 1/266
　　　　　　　　　　　　　　　　　　　　　　455/522
9,231,412 B2 * 1/2016 Lisi ...................... H02J 5/005
(Continued)

FOREIGN PATENT DOCUMENTS

JP　　2009-268311 A1　　11/2009
JP　　2013-034367 A1　　2/2013
(Continued)

OTHER PUBLICATIONS

International Search Report for International Application No. PCT/JP2015/057841 dated Jun. 9, 2015.

*Primary Examiner* — Richard V Muralidar
(74) *Attorney, Agent, or Firm* — Katz, Quintos & Hanson, LLP

(57) ABSTRACT

A wireless power supply system includes: a power transmitter; and power receivers configured to receive power through magnetic field resonance or electric field resonance. The transmitter groups the receivers into first groups based on degrees of coupling between the transmitter and the respective receivers in an initial state. The transmitter calculates, for the respective first groups, charging times required to charge the receivers, and a first total charging time for the first groups. The transmitter sets degrees of coupling greater than or equal to the degrees of coupling in the initial state, and again groups the receivers into second groups based on the set degrees. The transmitter calculates, for the respective second groups, charging times required to charge the receivers and a second total for the second groups, and starts to transmit the power when the second total time is less than or equal to the first total time.

13 Claims, 39 Drawing Sheets

(51) Int. Cl.
*H02J 50/12* (2016.01)
*H04B 5/00* (2006.01)
*H02J 50/40* (2016.01)
*H02J 50/80* (2016.01)

(58) Field of Classification Search
USPC .......................................................... 320/108
See application file for complete search history.

(56) References Cited

U.S. PATENT DOCUMENTS

| | | | |
|---|---|---|---|
| 9,806,534 B2 * | 10/2017 | Yamauchi | H02J 7/025 |
| 9,876,536 B1 * | 1/2018 | Bell | H04B 5/0037 |
| 9,953,763 B2 * | 4/2018 | Uchida | H02J 5/005 |
| 2009/0271048 A1 | 10/2009 | Wakamatsu | |
| 2011/0316334 A1 | 12/2011 | Shimokawa | |
| 2013/0002036 A1 | 1/2013 | Kamata | |
| 2015/0008736 A1 | 1/2015 | Uchida | |

FOREIGN PATENT DOCUMENTS

| | | | |
|---|---|---|---|
| WO | 2010106636 A1 | 9/2010 | |
| WO | 2013146929 A1 | 10/2013 | |

* cited by examiner

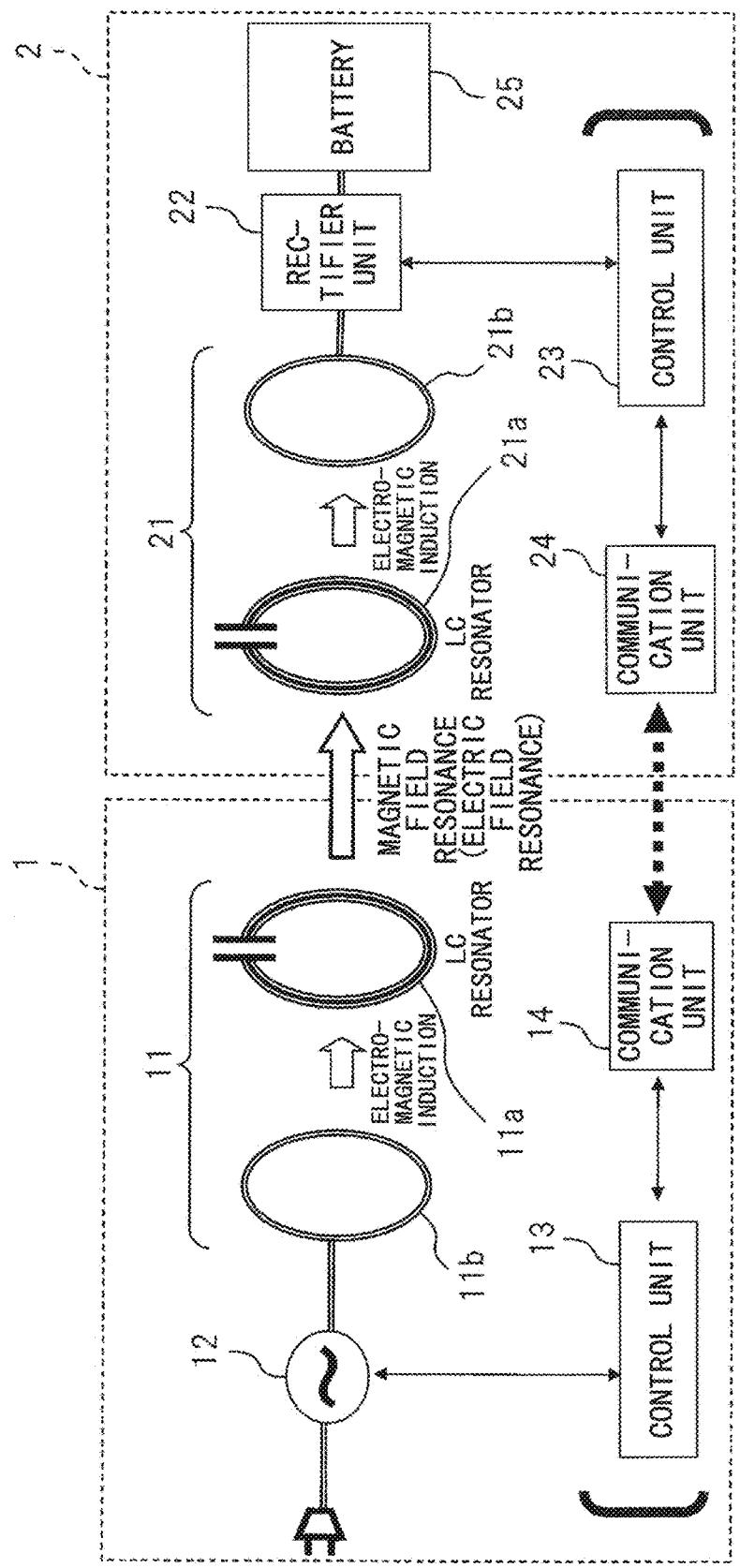

[EXAMPLE OF THREE-COILS STRUCTURE]

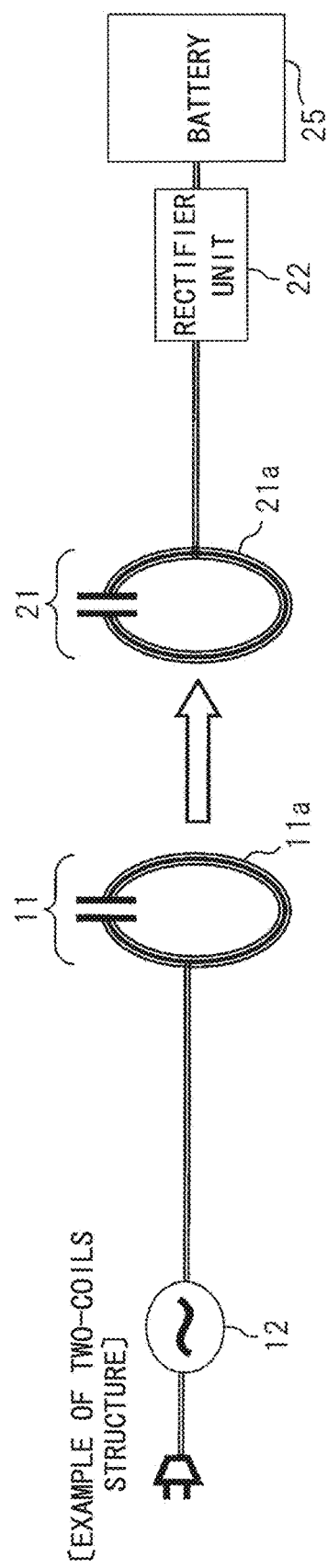

FIG.10C

[POWER TRANSMISSION AT POWER RATIO OF 1:1 (9 W: 9 W)]

EFFICIENCY OF POWER RECEIVER 2A
30.1%
EFFICIENCY OF POWER RECEIVER 2B
30.1%
    OVERALL EFFICIENCY  60.2%

⇒POWER TRANSMISSION OUTPUT  29.9 W
    POWER RECEIVER 2A  9 W
    POWER RECEIVER 2B  9 W
    SIMULTANEOUS POWER TRANSMISSION
    (POWER DISTRIBUTION AT 1:1)
    IS POSSIBLE

OVERALL EFFICIENCY IS SUBSTANTIALLY CONSTANT

[POWER TRANSMISSION AT POWER RATIO OF 2:1 (12 W: 6 W)]

EFFICIENCY OF POWER RECEIVER 2A
39.5%
EFFICIENCY OF POWER RECEIVER 2B
19.7%
    OVERALL EFFICIENCY  59.2%

⇒POWER TRANSMISSION OUTPUT  30.4 W
    POWER RECEIVER 2A  12 W
    POWER RECEIVER 2B  6 W
    SIMULTANEOUS POWER TRANSMISSION
    (POWER DISTRIBUTION AT 2:1)
    IS POSSIBLE

FIG.11C

[POWER TRANSMISSION AT POWER
RATIO OF 1:1 (9 W: 9 W)]

EFFICIENCY OF POWER RECEIVER 2A
18.2%
EFFICIENCY OF POWER RECEIVER 2B
18.2%
 OVERALL EFFICIENCY 36.4%

⇒POWER TRANSMISSION OUTPUT 49.5 W
 POWER RECEIVER 2A 9 W
 POWER RECEIVER 2B 9 W
 SIMULTANEOUS POWER TRANSMISSION
 (POWER DISTRIBUTION AT 1:1)
 IS POSSIBLE

OVERALL EFFICIENCY IS DECREASED

[POWER TRANSMISSION AT POWER
RATIO OF 2:1 (12 W: 6 W)]

EFFICIENCY OF POWER RECEIVER 2A
21.2%
EFFICIENCY OF POWER RECEIVER 2B
10.6%
 OVERALL EFFICIENCY 31.8%

⇒POWER TRANSMISSION OUTPUT 56.6 W UPPER LIMIT EXCEEDED
 SIMULTANEOUS POWER TRANSMISSION
 (POWER DISTRIBUTION AT 2:1) IS IMPOSSIBLE

TIME-DIVISION POWER TRANSMISSION (SINGLE EFFICIENCY 25%)
 POWER TRANSMITTER 2A OUTPUT:48 W POWER RECEIVER 1
 RECEIVED POWER:12 W
 POWER TRANSMITTER 2B OUTPUT:24 W POWER RECEIVER 2
 RECEIVED POWER:6 W
  TIME-DIVISION POWER TRANSMISSION IS POSSIBLE k=0.026
Q=600
kQ=15.3

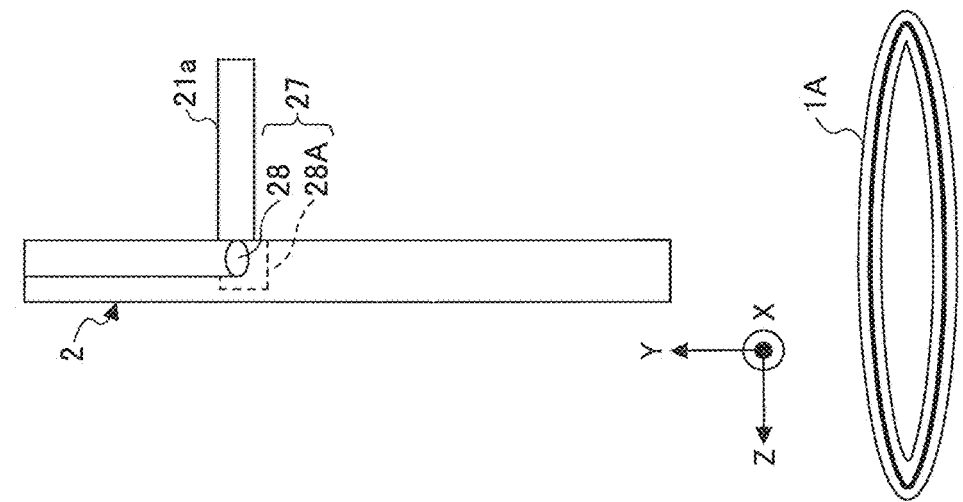
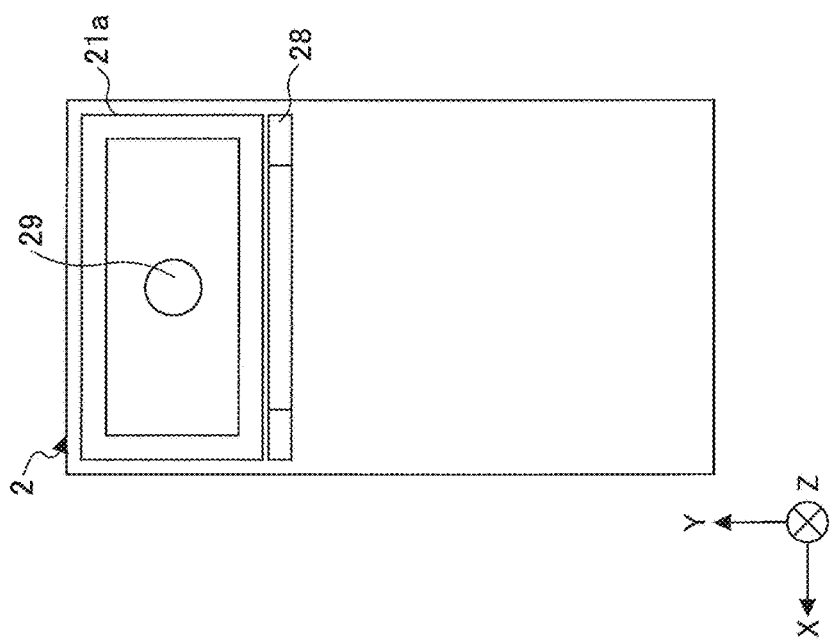
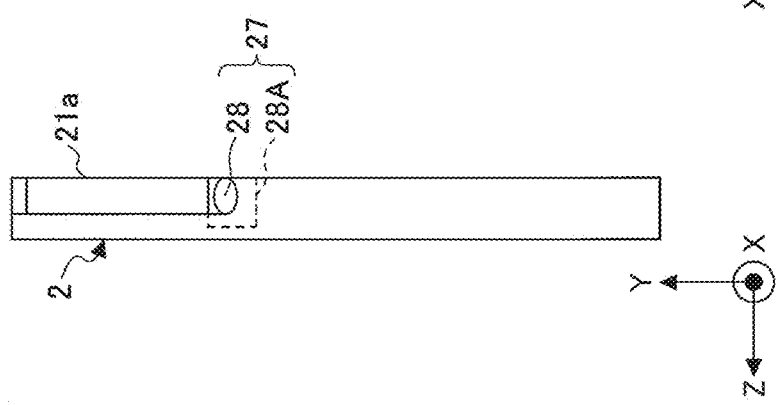

FIG.22

| GROUP NAME | EFFICIENCY OF ELECTRIC POWER RECEPTION (%) |
|---|---|
| G1 | $90 \leq \eta < 100$ |
| G2 | $80 \leq \eta < 90$ |
| G3 | $70 \leq \eta < 80$ |
| G4 | $60 \leq \eta < 70$ |
| G5 | $50 \leq \eta < 60$ |
| G6 | $40 \leq \eta < 50$ |
| G7 | $30 \leq \eta < 40$ |
| G8 | $20 \leq \eta < 30$ |
| G9 | $10 \leq \eta < 20$ |
| G10 | $0 \leq \eta < 10$ |

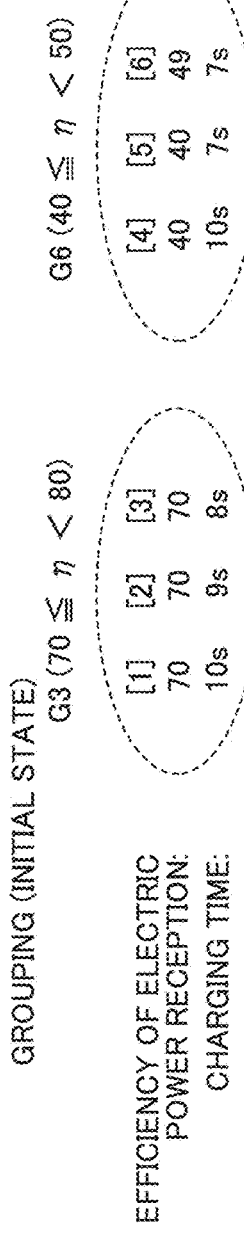
FIG. 27

FIG.28

| No. | GROUP 1 | GROUP 2 | SATISFIED? | TOTAL CHARGING TIME |
|---|---|---|---|---|
| 1 | [1] | [2], [3], [4], [5], [6] | × | |
| 2 | [2] | [1], [3], [4], [5], [6] | × | |
| 3 | [3] | [1], [2], [4], [5], [6] | × | |
| 4 | [4] | [1], [2], [3], [5], [6] | × | |
| 5 | [5] | [1], [2], [3], [4], [6] | ○ | 17s |
| 6 | [6] | [1], [2], [3], [4], [5] | × | |
| 7 | [1], [2] | [3], [4], [5], [6] | × | |
| 8 | [1], [3] | [2], [4], [5], [6] | × | |
| 9 | [1], [4] | [2], [3], [5], [6] | × | |
| 10 | [1], [5] | [2], [3], [4], [6] | × | |
| 11 | [1], [6] | [2], [3], [4], [5] | × | |
| 12 | [2], [3] | [1], [4], [5], [6] | × | |
| 13 | [2], [4] | [1], [3], [5], [6] | × | |
| 14 | [2], [5] | [1], [3], [4], [6] | × | |
| 15 | [2], [6] | [1], [3], [4], [5] | × | |
| 16 | [3], [4] | [1], [2], [5], [6] | × | |
| 17 | [3], [5] | [1], [2], [4], [6] | × | |
| 18 | [3], [6] | [1], [2], [4], [5] | × | |
| 19 | [4], [5] | [1], [2], [3], [6] | ○ | 20s |
| 20 | [4], [6] | [1], [2], [3], [5] | × | |
| 21 | [5], [6] | [1], [2], [3], [4] | ○ | 17s |
| 22 | [1], [2], [3] | [4], [5], [6] | ○ | 20s |
| 23 | [1], [2], [4] | [3], [5], [6] | × | |
| 24 | [1], [2], [5] | [3], [4], [6] | × | |
| 25 | [1], [2], [6] | [3], [4], [5] | × | |
| 26 | [1], [3], [4] | [2], [5], [6] | × | |
| 27 | [1], [3], [5] | [2], [4], [6] | × | |
| 28 | [1], [3], [6] | [2], [4], [5] | × | |
| 29 | [1], [4], [5] | [2], [3], [6] | × | |
| 30 | [1], [4], [6] | [2], [3], [5] | × | |
| 31 | [1], [5], [6] | [2], [3], [4] | × | |

FIG.29

GROUPING (INITIAL STATE)

G3 (70 ≤ η < 80)

| [1] | [2] | [3] |
|-----|-----|-----|
| 70  | 70  | 70  |
| 10s | 9s  | 8s  |

G6 (40 ≤ η < 50)

| [4] | [5] | [6] |
|-----|-----|-----|
| 40  | 40  | 45  |
| 10s | 7s  | 7s  |

EFFICIENCY OF ELECTRIC POWER RECEPTION:
CHARGING TIME:

TOTAL CHARGING TIME: 20sec
(10s + 10s)

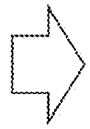

GROUPING BASED ON MAXIMUM VALUES $k_A$

G2 (80 ≤ η < 90)

| [1] | [2] | [6] |
|-----|-----|-----|
| 80  | 80  | 80  |
| 10s | 9s  | 7s  |

G3 (70 ≤ η < 80)

| [3] | [4] |
|-----|-----|
| 71  | 70  |
| 8s  | 10s |

G5 (50 ≤ η < 60)

| [5] |
|-----|
| 50  |
| 7s  |

EFFICIENCY OF ELECTRIC POWER RECEPTION:
CHARGING TIME:

TOTAL CHARGING TIME: 27sec
(10s + 10s + 7s)

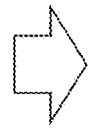

GROUPING BASED ON OPTIMIZATION

G3 (70 ≤ η < 80)

| [1] | [2] | [3] | [4] | [6] |
|-----|-----|-----|-----|-----|
| 79  | 79  | 71  | 70  | 79  |
| 10s | 9s  | 8s  | 10s | 7s  |

G5 (50 ≤ η < 60)

| [5] |
|-----|
| 50  |
| 7s  |

EFFICIENCY OF ELECTRIC POWER RECEPTION:
CHARGING TIME:

TOTAL CHARGING TIME: 17sec
(10s + 7s)

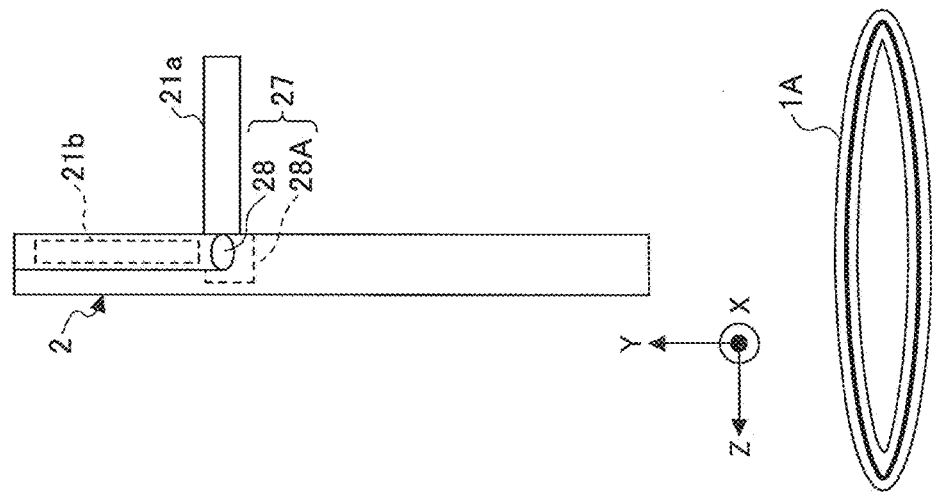
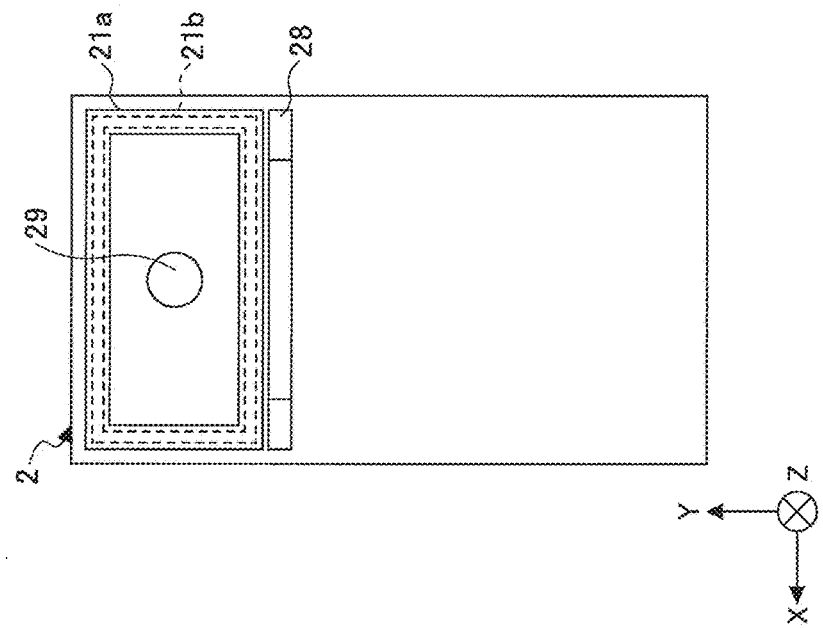
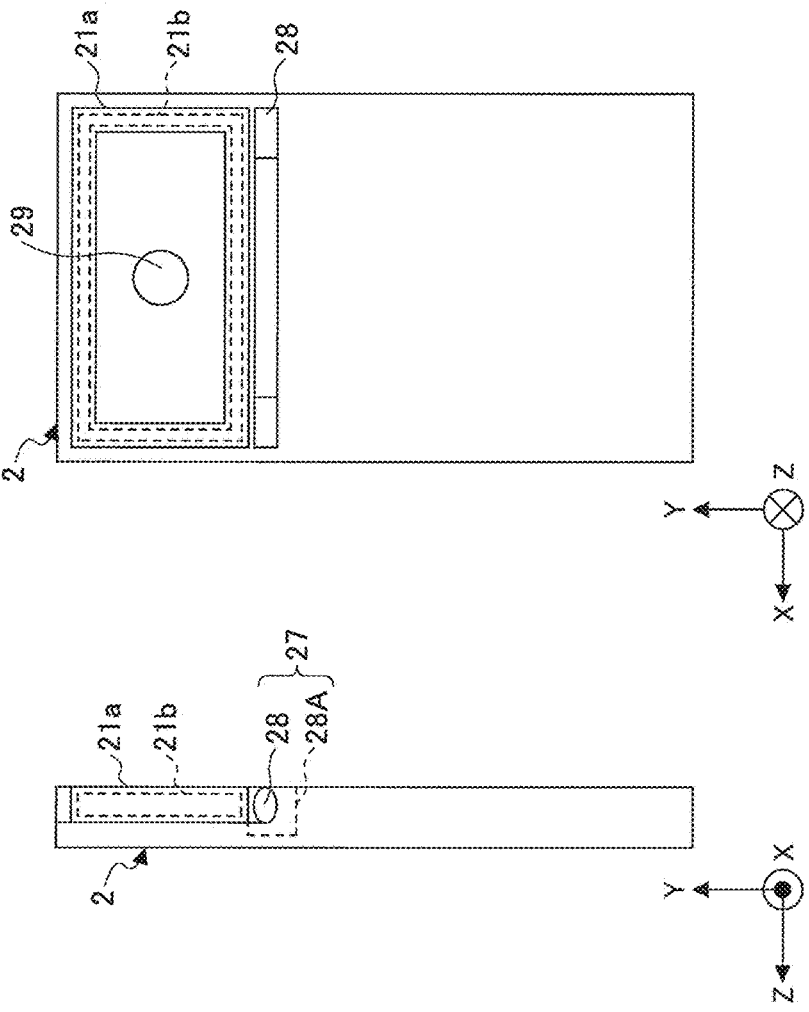

"PLEASE TILT TO LOWER THE RIGHT SIDE BY 5 DEGREES"

WIRELESS POWER SUPPLY SYSTEM, POWER TRANSMITTER, AND POWER TRANSMISSION METHOD

CROSS-REFERENCE TO RELATED APPLICATION

This application is a continuation application of International Application PCT/JP2015/057841 filed on Mar. 17, 2015 and designated the U.S., the entire contents of which are incorporated herein by reference.

FIELD

The embodiment discussed herein relates to a wireless power supply system, a power transmitter, and a power transmission method.

BACKGROUND

A power transmitting apparatus that includes a power transmission side communication unit that communicates with one or more power receiving apparatuses that receive transmitted power and includes a power transmission unit that transmits power to the one or more power receiving apparatuses in a non-contact manner is known in the related art. The power transmitting apparatus includes an allocating unit that divides transmission of power from the power transmission unit to the power receiving apparatuses in a plurality of dividing periods for each predetermined period and allocates to the one or more power receiving apparatuses one of the dividing periods. The power transmitting apparatus includes a power transmission control unit that selectively transmits power to the one or more power receiving apparatuses in a non-contact manner for a dividing period based on the allocation result in the allocating unit (for example, see Patent Document 1).

In the above system including the power transmitting apparatus and the power receiving apparatuses, coupling coefficients between the power transmitting apparatus and the power receiving apparatuses are set to be fixed values in accordance with types or the like of the power receiving apparatus.

However, the coupling coefficients may vary depending on positional relationships or the like between the power transmitting apparatus and the power receiving apparatuses or the like. Therefore, it is difficult for the above system to efficiently transmit power from the power transmitting apparatus to the power receiving apparatuses.

RELATED-ART DOCUMENTS

Patent Documents

[Patent Document 1] Japanese Laid-open Patent Publication No. 2009-268311

SUMMARY

According to an aspect of the embodiment, a wireless power supply system includes: a power transmitter including a primary-side resonant coil and configured to transmit electric power; and a plurality of power receivers including secondary-side resonant coils configured to receive the electric power from the primary-side resonant coil through magnetic field resonance or electric field resonance generated with the primary-side resonant coil. The power transmitter groups the plurality of power receivers into a plurality of first groups based on degrees of coupling between the power transmitter and the respective power receivers in an initial state. The power transmitter calculates, for the respective first groups, charging times required to charge all the power receivers, and calculates a first total charging time obtained by totaling the charging times for all the first groups. The power transmitter sets, to the power receivers, degrees of coupling that are greater than or equal to the degrees of coupling in the initial state. The power transmitter again groups the plurality of power receivers into a plurality of second groups based on the set degrees of coupling. The power transmitter calculates, for the respective second groups, charging times required to charge all the power receivers, and calculates a second total charging time obtained by totaling the charging times for the second groups. The power transmitter starts to transmit the electric power when the second total charging time is less than or equal to the first total charging time.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 3 is a block diagram schematically illustrating one example of a wireless power transmission system;

FIG. 4C is a diagram (3) for describing a modified example of transmission coils in the wireless power transmission system of FIG. 3;

FIG. 10C is a diagram (3) for describing one example of the three-dimensional wireless power transmission method for the plurality of power receivers;

FIG. 11C is a diagram (6) for describing one example of the three-dimensional wireless power transmission method for the plurality of power receivers;

FIGS. 18A to 18C are diagrams illustrating a power receiver;

FIG. 22 is a diagram illustrating data used for grouping;

FIG. 27 is a diagram illustrating an example of grouping according to an electric power transmission method of the embodiment;

FIG. 28 is a diagram illustrating all the ways of grouping when power receivers are grouped again through a process of FIG. 24;

FIG. 29 is a diagram illustrating an example of grouping according to an electric power transmission method of the embodiment;

FIGS. 30A to 30C are diagrams illustrating a power receiver according to a variation example of the embodiment;

DESCRIPTION OF EMBODIMENT

Hereinafter, an embodiment to which a wireless power supply system, a power transmitter, and a power transmission method of the present invention are applied will be described. An object of the embodiment is to provide a wireless power supply system, a power transmitter, and a power transmission method that can efficiently transmit electric power.

Embodiment

Before describing the wireless power supply system, the power transmitter, and the power transmission method of the embodiment in detail, a wireless power supply system according to a related art will be described, with reference to FIG. 1 to FIG. 11C. The wireless power supply system includes a plurality of power transmitters and a plurality of power receivers.

Figure 1A:
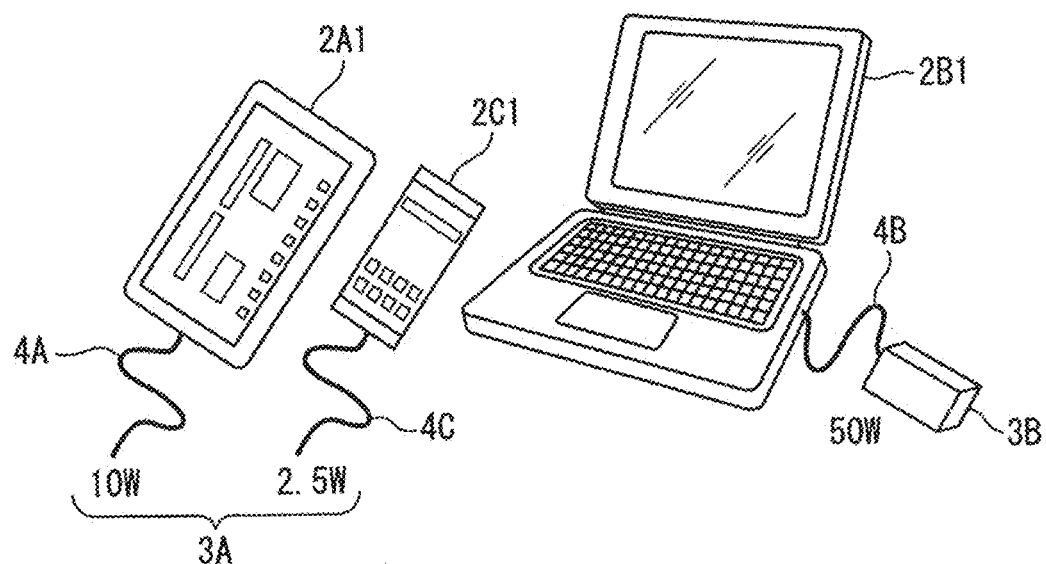
FIG. 1A is a diagram schematically illustrating one example of a wired power transmission system.
Figure 1B:
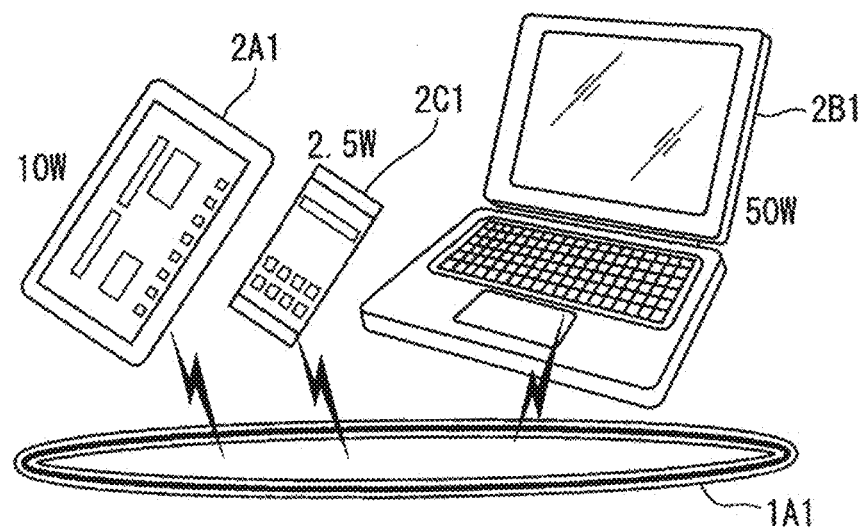
FIG. 1B is a diagram schematically illustrating one example of a wireless power transmission system.

FIG. 1A is a diagram schematically illustrating one example of a wired power transmission (wired power supply) system and FIG. 1B is a diagram schematically illustrating one example of a wireless power transmission (wireless power supply) system. In FIG. 1A and FIG. 1B, reference signs 2A1 to 2C1 respectively denote power receivers.

Here, the power receiver 2A1 represents, for example, a tablet computer (tablet) having a power requirement of 10 W, the power receiver 2B1 represents, for example, a notebook computer having a power requirement of 50 W, and the power receiver 2C1 represents, for example, a smartphone having a power requirement of 2.5 W. The power requirements correspond to, for example, electric powers for charging rechargeable batteries (secondary batteries) in the respective power receivers 2A1 to 2C1.

As illustrated in FIG. 1A, generally, when the secondary batteries of the tablet 2A1 and the smartphone 2C1 are charged, for example, the tablet 2A1 and the smartphone 2C1 are connected to a USB (Universal Serial Bus) terminal (or a dedicated power supply or the like) 3A of a Personal Computer via power supply cables 4A and 4C. When the secondary battery of the notebook computer 2B1 is charged, for example, the notebook computer 2B1 is connected to a dedicated power supply (AC-DC Converter) 3B via a power supply cable 4B.

That is, even for the portable power receivers 2A1 to 2C1, wired power supply (wired power transmission) is generally performed, from the USB terminal 3A or the power supply 3B, using the power supply cables 4A to 4C, as illustrated in FIG. 1A.

With the recent advance in non-contact power supply technology typified by electromagnetic induction, for example, wireless power supply (wireless power transmission) has come into practice in a shaver, an electric toothbrush, and the like. For example, electric power may be wirelessly transferred from a power transmitter 1A1 to the tablet 2A1, the notebook computer 2B1, and the smartphone 2C1, as illustrated in FIG. 1B.

Figure 2A:
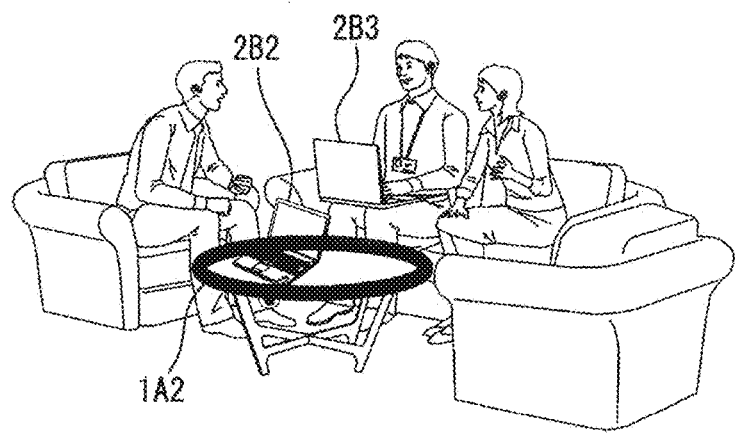
FIG. 2A is a diagram schematically illustrating one example of a two-dimensional wireless power transmission system.

FIG. 2A is a diagram schematically illustrating one example of a two-dimensional wireless power transmission (two-dimensional wireless power supply) system, and illustrates, for example, how electric power is wirelessly transferred through electromagnetic induction, similarly to, for example, the above-mentioned shaver or electric toothbrush.

As illustrated in FIG. 2A, when electric power is wirelessly transferred using electromagnetic induction, electric power may be supplied only to a power receiver which is nearly in contact with a power transmitter 1A2 because of the short power transmission distance even in non-contact power supply.

That is, although electric power may be supplied to a power receiver (notebook computer) 2B2 placed on the power transmitter (power receiving mount) 1A2, it is difficult to supply electric power to a notebook computer 2B3 away from the power receiving mount 1A2. In this manner, the wireless power transmission system illustrated in FIG. 2A serves as a two-dimensional wireless power supply system that enables free arrangement on the power receiving mount 1A2.

Figure 2B:
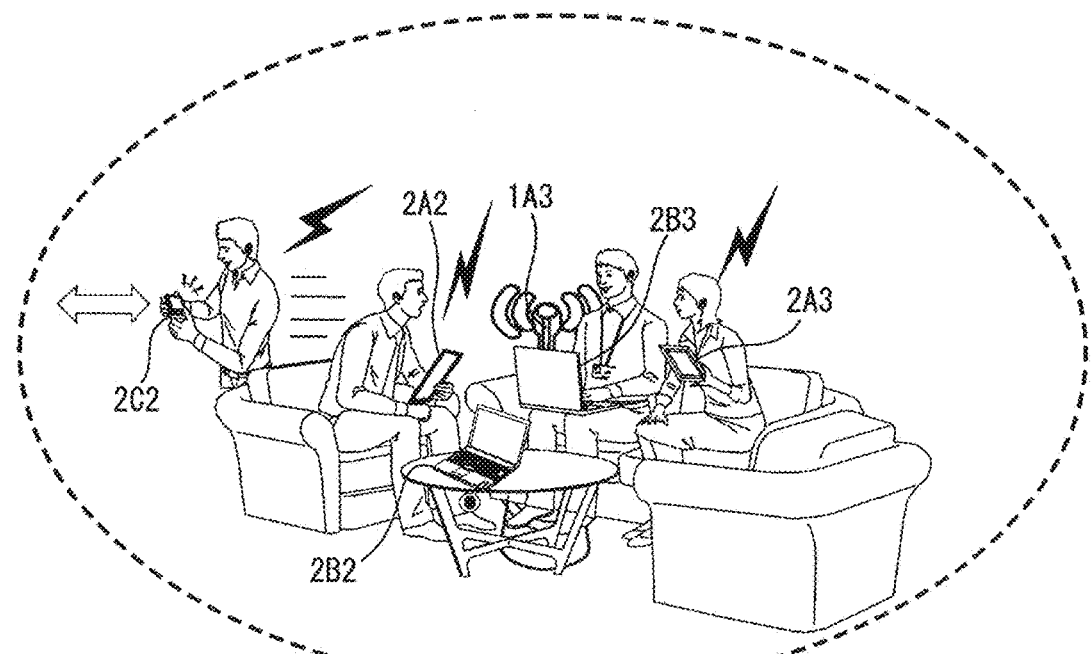
FIG. 2B is a diagram schematically illustrating one example of a three-dimensional wireless power transmission system.

FIG. 2B is a diagram schematically illustrating one example of a three-dimensional wireless power transmission (three-dimensional wireless power supply) system, and illustrates, for example, how electric power is wirelessly transferred using magnetic field resonance or electric field resonance. As illustrated in FIG. 2B, when electric power is wirelessly transferred using magnetic field resonance or electric field resonance, electric power may be supplied from the power transmitter A2 to a plurality of power receivers that are located within a predetermined range (inside of a broken line in FIG. 2B).

That is, electric power may be wirelessly transferred from a power transmitter A3 to tablets 2A2 and 2A3, the notebook computers 2B2 and 2B3, and a smartphone 2C2 that fall within a predetermined range. Although FIG. 2B depicts only one power transmitter A3, a plurality of power transmitters wirelessly transfer electric power to a plurality of power receivers at various angles and positions, using magnetic field resonance or electric field resonance.

In this manner, the wireless power transmission system illustrated in FIG. 2B serves as, for example, a three-dimensional wireless power supply system that uses magnetic field resonance to enable a high power transmission efficiency for a space farther than that using electromagnetic induction.

FIG. 3 is a block diagram schematically illustrating one example of a wireless power transmission (three-dimensional wireless power supply) system. In FIG. 3, reference sign 1 denotes a primary side (a power transmitting side: a power transmitter), and reference sign 2 denotes a secondary side (a power receiver side: a power receiver).

As illustrated in FIG. 3, the power transmitter includes a wireless power transmitting unit 11, a power source unit 12, a control unit 13, and a communication unit 14. In addition, the power receiver 2 includes a wireless power receiving unit 21, a rectifier unit 22, a control unit 23, and a communication unit 24.

The wireless power transmitting unit 11 includes a first coil (a power supply coil) 11$b$ and a second coil (a primary-side resonant coil) 11$a$, and the receiving unit 21 includes a third coil (a secondary-side resonant coil) 21$a$ and a fourth coil (a power extraction coil) 21$b$.

As illustrated in FIG. 3, the power transmitter 1 and the power receiver 2 perform energy (electric power) transmission from the power transmitter 1 to the power receiver 2 through magnetic field resonance (or electric field resonance) between the primary-side resonant coil 11$a$ and the secondary-side resonant coil 21$a$. Note that electric power may be transmitted from the primary-side resonant coil 11$a$ to the secondary-side resonant coil 21$a$ not only through magnetic field resonance but also electric field resonance or the like. However, the following description will be given mainly by way of example of magnetic field resonance.

The power transmitter 1 and the power receiver 2 communicate with each other by the communication unit 14 and the communication unit 24. Note that, a distance of electric power transmission (a power transmission range) through the primary-side resonant coil 11$a$ of the power transmitter 1 and the secondary-side resonant coil 21$a$ of the power receiver 2 is set to be shorter than a distance of communication (a communication range) through the communication unit 14 of the power transmitter 1 and the communication unit 24 of the power receiver 2.

In addition, electric power transmission by the primary-side resonant coil 11$a$ and the secondary-side resonant coil 21$a$ is performed by a system (an out-band communication) independent from communication by the communication units 14 and 24. Specifically, electric power transmission by the resonant coils 11$a$ and 21$a$ uses, for example, a frequency band of 6.78 MHz, whereas communication by the communication units 14 and 24 uses, for example, a frequency band of 2.4 GHz.

The communication by the communication units 14 and 24 may use, for example, a DSSS wireless LAN system based on IEEE 802.11b or use Bluetooth (registered trademark).

The above described wireless power transmission system performs electric power transmission using magnetic field resonance or electric field resonance by the primary-side resonant coil 11$a$ of the power transmitter 1 and the secondary-side resonant coil 21$a$ of the power receiver 2, for example, with respect to a near field of a distance of approximately the wavelength of the frequency used. Accordingly, the range of electric power transmission (a power transmission range) varies with the frequency used for electric power transmission.

The power source unit 12 is a high frequency power supply unit that supplies electric power to the power supply coil (the first coil) 11$b$. The power supply coil 11$b$ supplies electric power to the primary-side resonant coil 11a arranged very close to the power supply coil 11b by using electromagnetic induction. The primary-side resonant coil 11a transmits electric power to the secondary-side resonant coil 21a (the power receiver 2) at a resonance frequency that generates magnetic field resonance between the resonant coils 11a and 21a.

The secondary-side resonant coil 21a supplies electric power to the power extraction coil (the fourth coil) 21b arranged very close to the secondary-side resonant coil 21a, by using electromagnetic induction. The power extraction coil 21b is connected to the rectifier unit 22 to extract a predetermined amount of electric power. The electric power extracted from the rectifier unit 22 is used, for example, for charging a battery with respect to a battery (load) 25, as an electric power output to the circuits of power receiver 2, or the like.

Note that, the power source unit 12 of the power transmitter 1 is controlled by the control unit 13, and the rectifier unit 22 of the power receiver 2 is controlled by the control unit 23. Then, the control unit 13 and the control unit 23 are connected via the communication units 14 and 24, and adapted to perform various controls so that electric power transmission from the power transmitter 1 to the power receiver 2 may be performed in a preferable state.

Figure 4A:
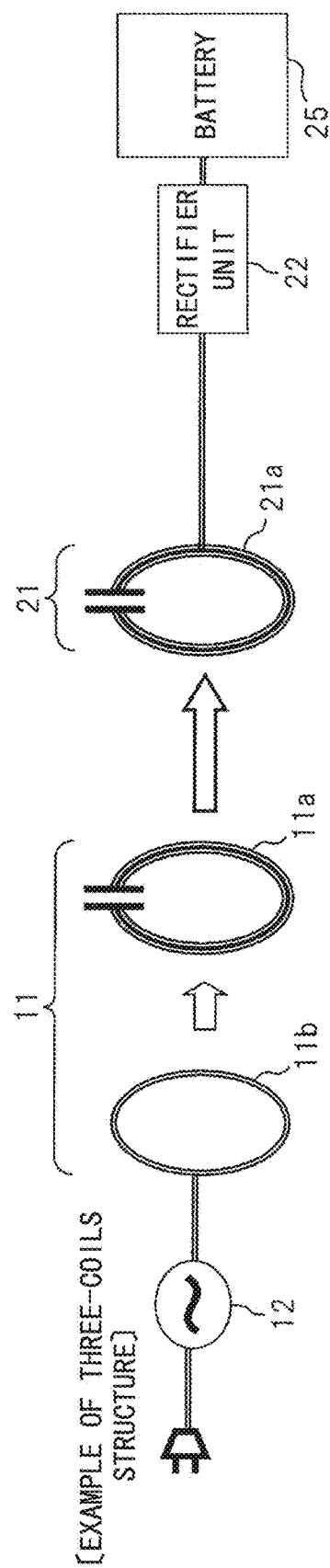
FIG. 4A is a diagram (1) for describing a modified example of transmission coils in the wireless power transmission system of FIG. 3.
Figure 4B:
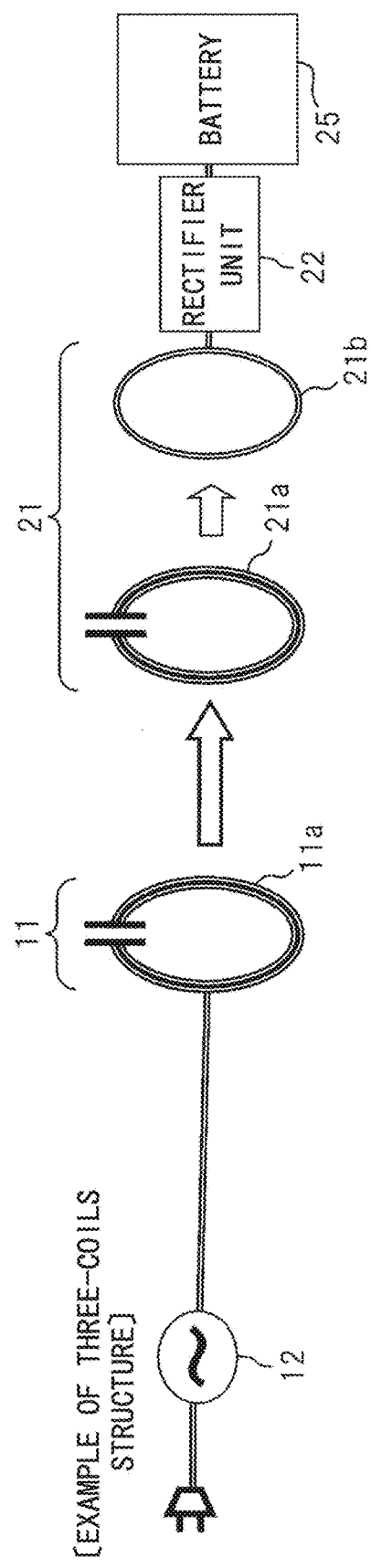
FIG. 4B is a diagram (2) for describing a modified example of transmission coils in the wireless power transmission system of FIG. 3.

FIG. 4A to FIG. 4C are diagrams for describing variation examples of transmission coils in the wireless power transmission system of FIG. 3. Note that, FIG. 4A and FIG. 4B depict exemplary three-coil structures, and FIG. 4C depicts an exemplary two-coil structure.

Specifically, in the wireless power transmission system illustrated in FIG. 3, the wireless power transmitting unit 11 includes the first coil 11b and the second coil 11a, and the power receiving unit 21 includes the third coil 21a and the fourth coil 21b.

Conversely, in the example of FIG. 4A, the power receiving unit 21 is set as a single coil (a secondary-side resonant coil: an LC resonator) 21a, and in the example of FIG. 4B, the wireless power transmitting unit 11 is set as a single coil (a primary-side resonant coil: an LC resonator) 11a.

Further, in the example of FIG. 4C, the power receiving unit 21 is set as a single secondary-side resonant coil 21a and the wireless power transmitting unit 11 is set as a single primary-side resonant coil 11a. Note that, FIG. 4A to FIG. 4C are merely examples and, obviously, various modifications may be made.

FIG. 5A to FIG. 5D are circuit diagrams illustrating examples of an independent resonant coil (the secondary-side resonant coil 21a), and FIG. 6A to FIG. 6D are circuit diagrams illustrating examples of a resonant coil (the secondary-side resonant coil 21a) connected to a load or a power supply.

Note that, FIG. 5A to FIG. 5D correspond to the secondary-side resonant coil 21a of FIG. 3 and FIG. 4B, and FIG. 6A to FIG. 6D correspond to the secondary-side resonant coil 21a of FIG. 4A and FIG. 4C.

Figure 5A:
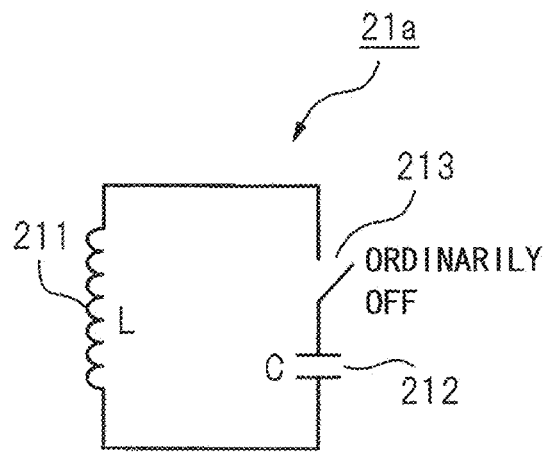
FIG. 5A is a circuit diagram (1) illustrating an example of an independent resonant coil.
Figure 5B:
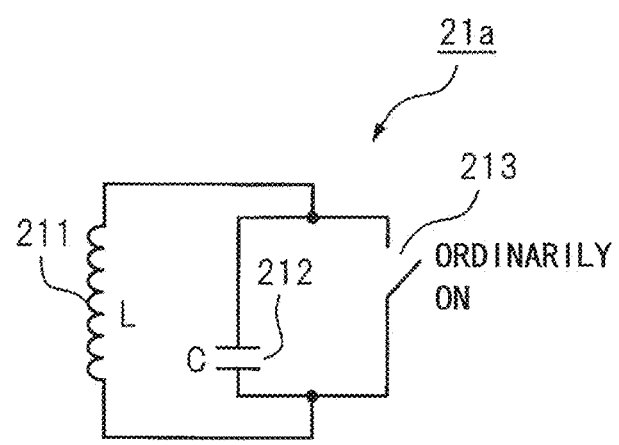
FIG. 5B is a circuit diagram (2) illustrating an example of the independent resonant coil.
Figure 6A:
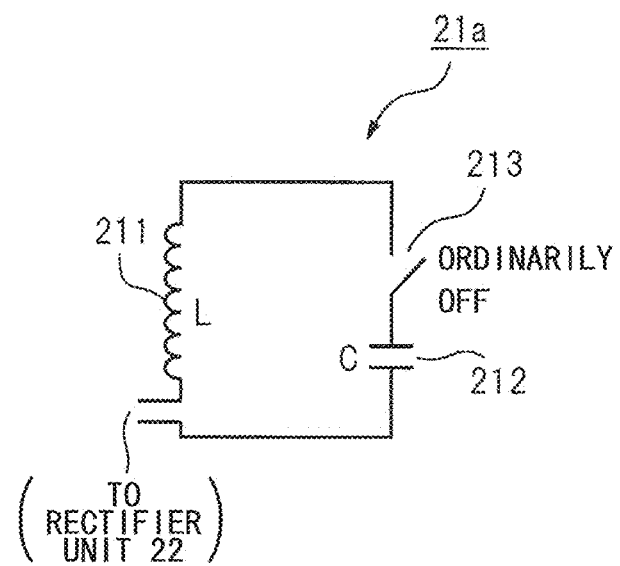
FIG. 6A is a circuit diagram (1) illustrating an example of the resonant coil connected to a load or a power supply.

In the examples illustrated in FIG. 5A and FIG. 6A, the secondary-side resonant coil 21a includes a coil (L) 211, a capacitor (C) 212, and a switch 213 connected in series, in which the switch 213 is ordinarily in an off-state. In the examples illustrated in FIG. 5B and FIG. 6B, the secondary-side resonant coil 21a includes the coil (L) 211 and the capacitor (C) 212 connected in series, and the switch 213 connected in parallel to the capacitor 212, in which the switch 213 is ordinarily in an on-state.

Figure 5C:
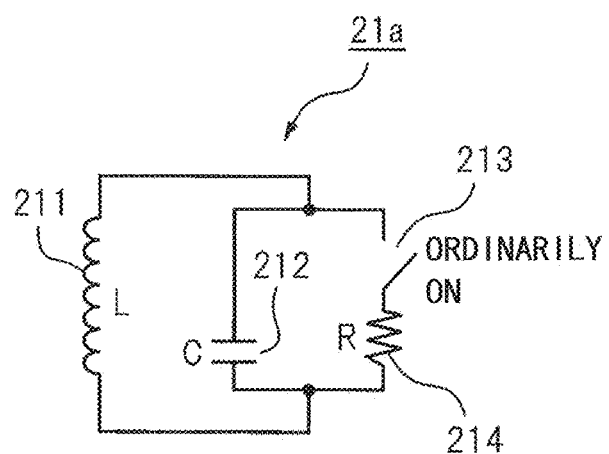
FIG. 5C is a circuit diagram (3) illustrating an example of the independent resonant coil.
Figure 6B:
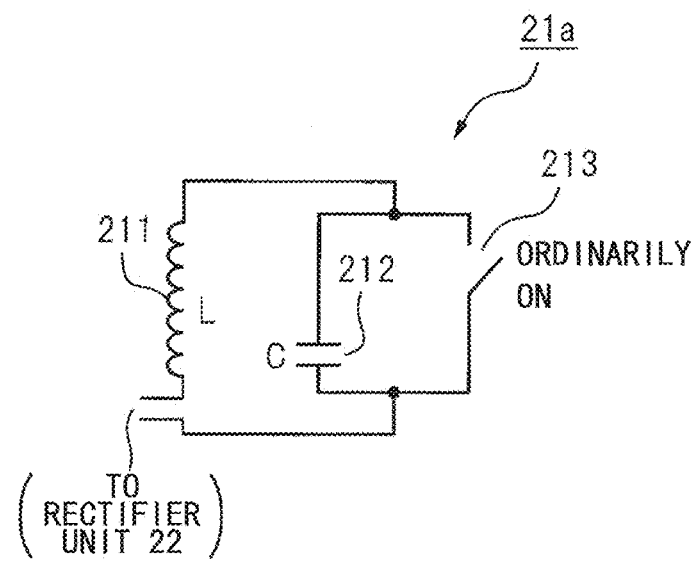
FIG. 6B is a circuit diagram (2) illustrating an example of the resonant coil connected to the load or the power supply.
Figure 6C:
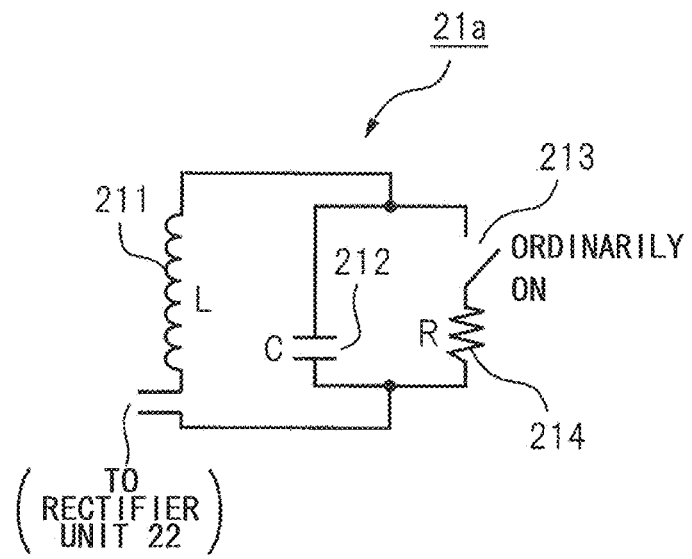
FIG. 6C is a circuit diagram (3) illustrating an example of the resonant coil connected to the load or the power supply.

In the examples illustrated in FIG. 5C and FIG. 6C, the secondary-side resonant coil 21a of FIG. 5B and FIG. 6B includes the switch 213 and the resistance (R) 214 connected in series and arranged in parallel to the capacitor 212, in which the switch 213 is ordinarily in the on-state.

Figure 5D:
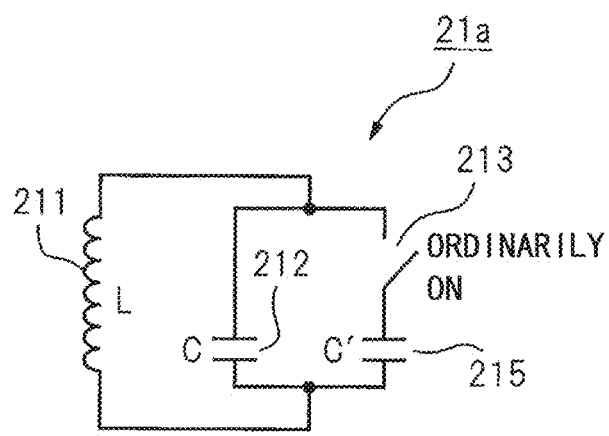
FIG. 5D is a circuit diagram (4) illustrating an example of the independent resonant coil.
Figure 6D:
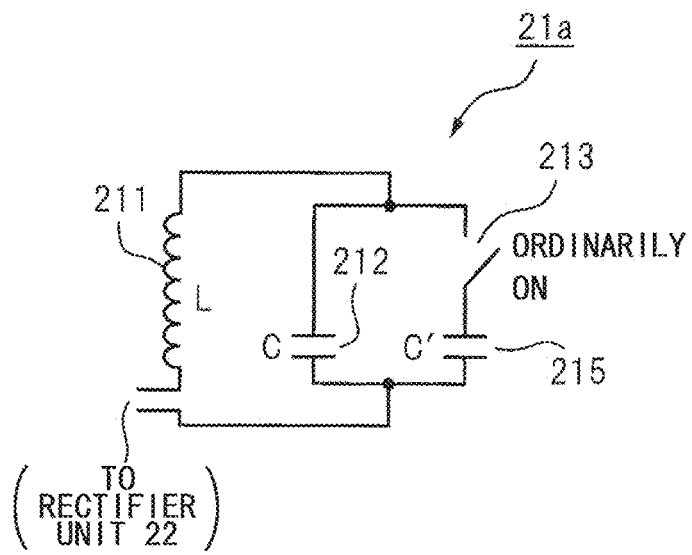
FIG. 6D is a circuit diagram (4) illustrating an example of the resonant coil connected to the load or the power supply.

In the examples of FIG. 5D and FIG. 6D, the secondary-side resonant coil 21a of FIG. 5B and FIG. 6B includes the switch 213 and another capacitor (C') 215 connected in series therewith and arranged in parallel to the capacitor 212, in which the switch 213 is ordinarily in the on-state.

In each of the secondary-side resonant coils 21a described above, the switch 213 is set to "off" or "on" so that the secondary-side resonant coil 21a does not operate under ordinary conditions. The reason for this is, for example, to prevent heat generation or the like caused by electric power transmission to a power receiver 2 not in use or to a power receiver 2 out of order.

In the above structure, the primary-side resonant coil 11a of the power transmitter 1 may also be set similarly as in FIG. 5A to FIG. 5D and FIG. 6A to FIG. 6D. However, the primary-side resonant coil 11a of the power transmitter may be set to operate under ordinary conditions and may be controlled to be turned on/off by an output of the power source unit 12. In this case, in the primary-side resonant coil 11a, the switch 213 is closed in FIG. 5A and FIG. 6A.

In this manner, when a plurality of power receivers 2 are present, selecting only the secondary-side resonant coil 21a of a predetermined power receiver 2 to which electric power is to be transmitted from the power transmitter 1 and making it in an operable state enables the electric power to be transmitted (time-division power transmission) to the selected power receiver 2.

Figure 7A:
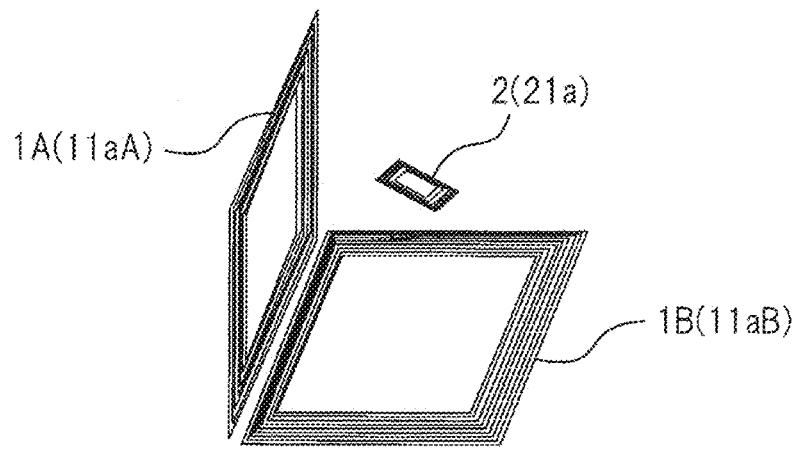
FIG. 7A is a diagram (1) for describing an example of controlling a magnetic field by a plurality of power transmitters.
Figure 7B:
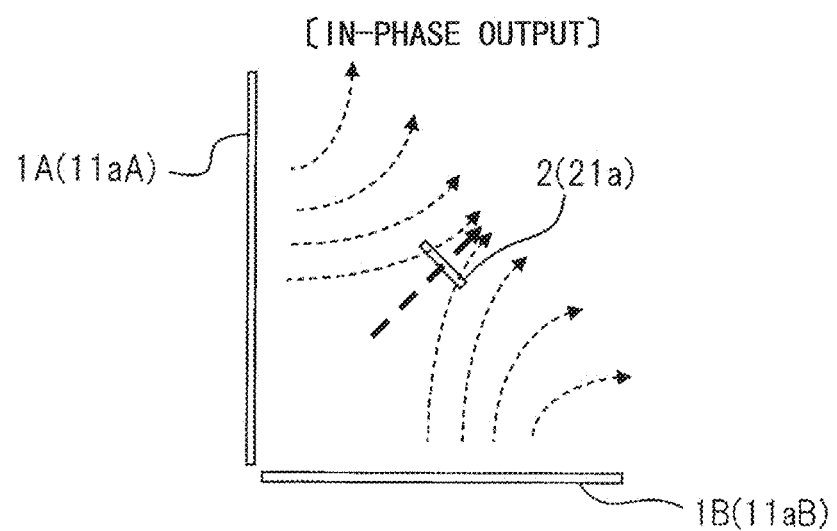
FIG. 7B is a diagram (2) for describing an example of controlling a magnetic field by a plurality of power transmitters.
Figure 7C:
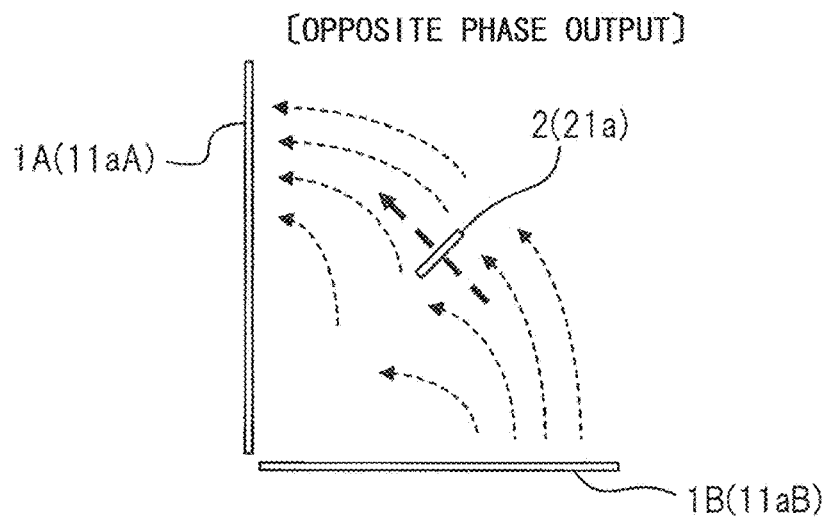
FIG. 7C is a diagram (3) for describing an example of controlling a magnetic field by the plurality of power transmitters.

FIG. 7A to FIG. 7C are diagrams for describing examples of controlling a magnetic field by a plurality of power sources. In FIG. 7A to FIG. 7C, reference signs 1A and 1B denote power transmitters, and reference sign 2 denotes a power receiver.

As illustrated in FIG. 7A, a primary-side resonant coil 11aA for power transmission used for magnetic field resonance of the power transmitter 1A and a primary-side resonant coil 11aB for power transmission used for magnetic field resonance of the power transmitter 1B are disposed, for example, so as to be orthogonal to each other.

Further, the secondary-side resonant coil 21a for power reception used for magnetic field resonance of the power receiver 2 is arranged at a different angle (an angle not parallel) at a position surrounded by the primary-side resonant coils 11aA and 11aB.

Here, the primary-side resonant coils (LC resonators) 11aA and 11aB may also be provided in a single power transmitter. That is, a single power transmitter may include a plurality of wireless power transmitting units 11.

FIG. 7B depicts a situation in which the primary-side resonant coils 11aA and 11aB output an in-phase magnetic field, and FIG. 7C depicts a situation in which the primary-side resonant coils 11aA and 11aB output an opposite phase magnetic field.

For example, by comparing the cases where the two orthogonal primary-side resonant coils 11aA and 11aB output in-phase magnetic fields and reverse phase magnetic fields, the combined magnetic fields are related by a rotation of 90 degrees, and electric power is transmitted to the power receivers 2 (secondary-side resonant coils 21a) suited to the orientations of the respective power receiver 2.

As described above, when electric power by the plurality of power sources 1A and 1B is transmitted to the power receiver 2 positioned at any position and an orientation (angle), magnetic fields generated at the primary-side resonant coils 11aA and 11aB of the power transmitters 1A and 1B change variously.

The above described wireless power transmission system includes a plurality of power transmitters and at least one power receiver and adjusts outputs (strengths and phases) between the plurality of power transmitters according to a position (X, Y, Z) and an orientation (θX, θY, θZ) of the power receiver.

In addition, it will be seen that, with respect to a three-dimensional space, for example, three or more power transmitters are used in the actual three-dimensional space to adjust the respective output phase differences and the output intensity ratios so as to control the magnetic field (electric field) in any direction in the three-dimensional space.

Figure 8A:
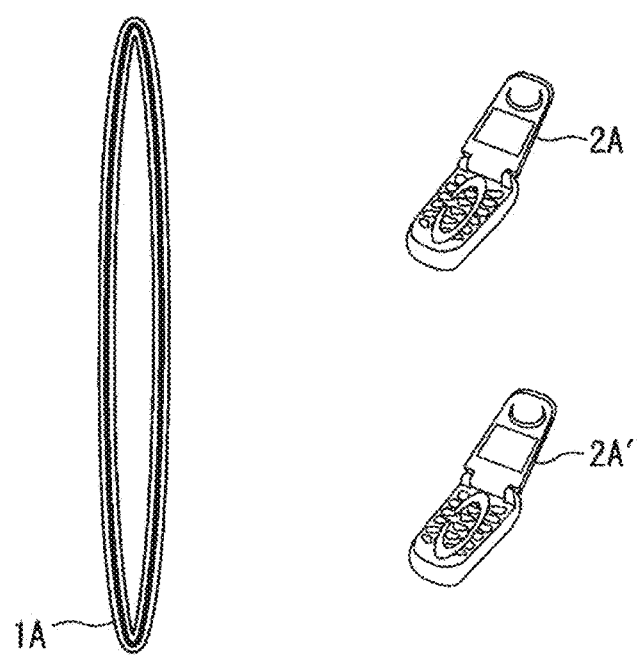
FIG. 8A is a diagram (1) for describing wireless power transmission to the plurality of power receivers.
Figure 8B:
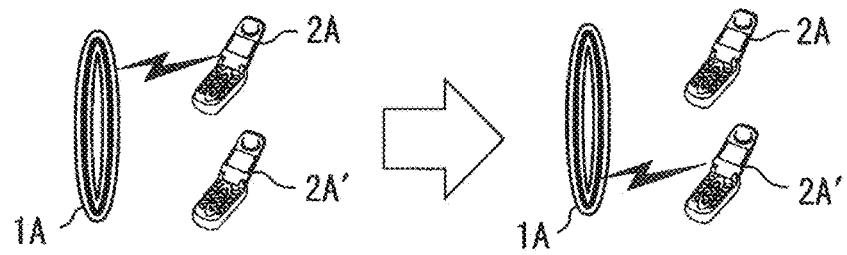
FIG. 8B is a diagram (2) for describing wireless power transmission to the plurality of power receivers.
Figure 8C:
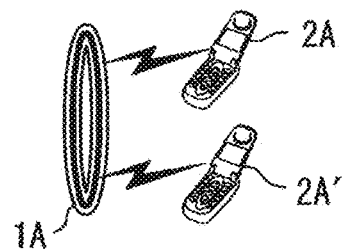
FIG. 8C is a diagram (3) for describing wireless power transmission to the plurality of power receivers.

FIG. 8A to FIG. 8C are diagrams for describing wireless power transmission to a plurality of power receivers. For the sake of simplicity, although FIG. 8A to FIG. 8C depict only one power transmitter A and two power receivers (mobile phones) 2A and 2A', the number of power transmitters and the number and types of power receivers or the like may obviously vary. That is, assume that one power transmitter A is used to wirelessly supply electric power to the two power receivers 2A and 2A', as illustrated in FIG. 8A.

First, when electric power is supplied by time-division power transmission, the electric power is supplied to only one power receiver 2A, as illustrated on the left of FIG. 8B, and the electric power is then supplied to only the other power receiver 2A, as illustrated on the right of FIG. 8B. Note that the same applies when three or more power receivers are used, and electric power is wirelessly supplied to the power receivers by sequentially switching the power receivers to be supplied with the electric power in a time-division manner.

That is, in time-division power transmission, when a plurality of power receivers are provided, power receivers to be supplied with electric power are sequentially selected to allow one power receiver to always correspond to the power transmitter at a certain moment. At this time, control may be performed similarly as in, for example, the case where power transmitters and power receivers are provided in one-to-one correspondence. However, as a result of time division, the time taken for power supply (full charging) corresponds to the number of power receivers, and the time to supply electric power to two power receivers is therefore twice that to supply electric power to one power receiver.

Next, when electric power is wirelessly supplied by simultaneous power transmission, one power transmitter 1A supplies the electric power to both the two power receivers 2A and 2A', as illustrated in FIG. 8C. Note that the same applies when three or more power receivers are used, and the electric power is simultaneously and wirelessly supplied to the plurality of power receivers.

In this simultaneous power transmission, when, for example, two power receivers are provided, because electric power is simultaneously supplied to the two power receivers, and supplying electric power for a time corresponding to only one power receiver may be sufficient regardless of the number of power receivers to be simultaneously supplied with power. Thus, this power supply method (wireless power transmission method) is desirable in terms of user benefits.

However, for simultaneous power supply (simultaneous power transmission) to a plurality of power receivers, control is done differently from the case of only one power receiver.

Figure 9A:
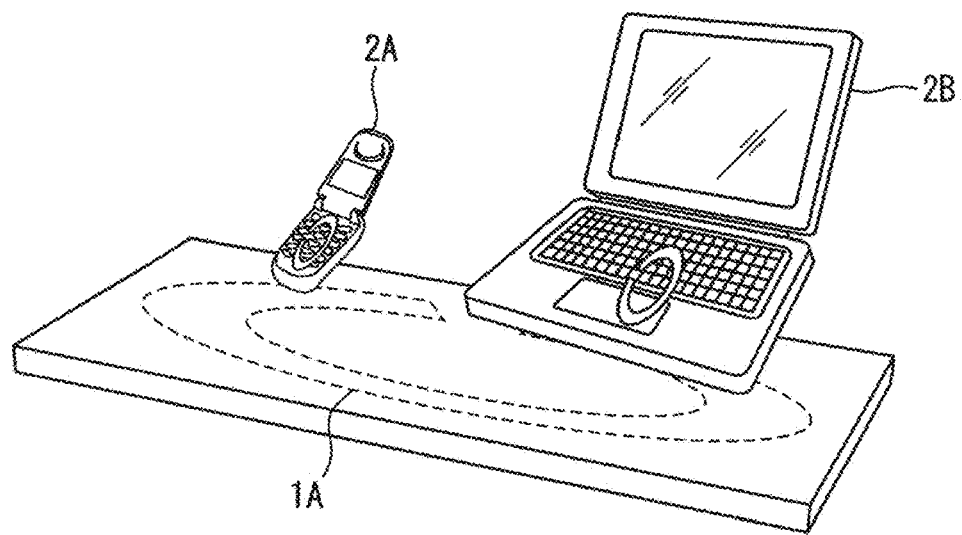
FIG. 9A is a diagram (1) for describing one example of a two-dimensional wireless power transmission method for a plurality of power receivers.
Figure 9B:
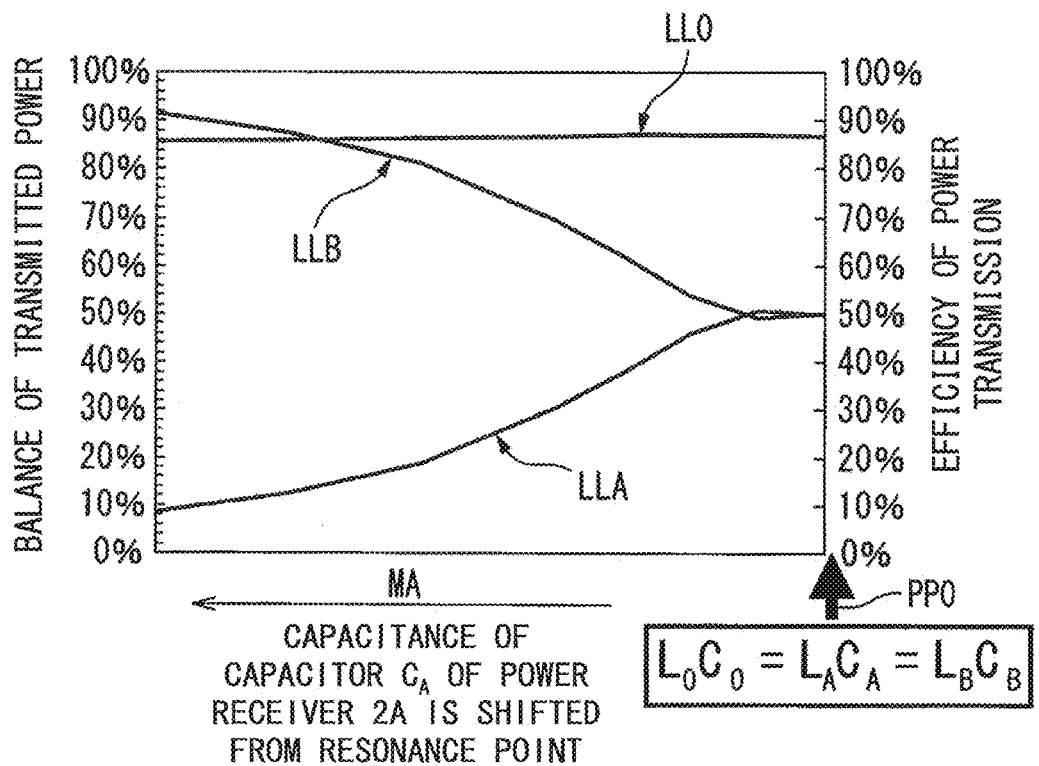
FIG. 9B is a diagram (2) for describing one example of the two-dimensional wireless power transmission method for the plurality of power receivers.

FIG. 9A and FIG. 9B are diagrams for describing one example of a two-dimensional wireless power transmission method for a plurality of power receivers. FIG. 9A illustrates, for example, how electric power is wirelessly supplied to two power receivers 2A and 2B having different power requirements by one power transmitter 1A, using magnetic field resonance. Referring to FIG. 9B, reference sign LL0 denotes the overall power transmission efficiency; LLA denotes the electric power received by the mobile phone 2A; and LLB denotes the electric power received by the notebook computer 2B.

The power receiver 2A represents, for example, a mobile phone having a power requirement of 5 W and the power receiver 2B represents, for example, a notebook computer having a power requirement of 50 W. For the sake of simplicity, an LC resonator (a power receiving unit) for the mobile phone 2A and an LC resonator for the notebook computer 2B have the same specifications.

In the two-dimensional wireless power transmission system, when electric power is simultaneously and wirelessly supplied to a plurality of power receivers, the amount of electric power received by each power receiver may often be different. For example, as illustrated in FIG. 9A, for a mobile phone having a power requirement of 5 W and a notebook computer having a power requirement of 50 W, or even for the same types of power receivers, the power requirement may be different depending on the remaining battery level.

Under the circumstances, for example, in the two-dimensional wireless power transmission system, because the conditions of distance and orientation of the power receivers 2A and 2B placed on the power transmitter 1A may have only a small difference, electric power is equally distributed when they are equipped with power receiving coils having the same specifications.

Thus, as illustrated in FIG. 9A, even for power receivers 2A and 2B having power requirements different by 10 times, when, for example, an output corresponding to a power requirement of 55 W is output from the power transmitter 1A, the power receivers 2A and 2B each receive an electric power of 27.5 W.

That is, the mobile phone 2A and the notebook computer 2B include, for example, secondary-side resonant coils 21a as illustrated in FIG. 5A, and the inductances of their coils 211 and the capacitances of their capacitors 212 take equal values.

Specifically, let $L_A$ be the inductance in the power receiving secondary-side resonant coil of the mobile phone 2A, $C_A$ be its capacitance, $L_B$ be the inductance in the secondary-side resonant coil of the notebook computer 2B, and $C_B$ be its capacitance. In this case, as indicated by reference sign PP0, $L_0C_0 = L_AC_A = L_BC_B$ is satisfied in the as-is state (the state in which the resonance point is not shifted).

Accordingly, assuming, for example, that the electric power transmitted from the power transmitter 1A is 68.75 W and its efficiency of electric power transmission is 80%, both the mobile phone 2A and the notebook computer 2B receive an electric power of 27.5 W.

However, because the mobile phone 2A has the power requirement of 5 W and the notebook computer 2B has the power requirement of 50 W, the resonance point of the power receiving resonant coil of the mobile phone 2A is shifted to control for a decrease in the efficiency of electric power reception.

For example, as indicated by the arrow MA in FIG. 9B, the capacitance $C_A$ in the power receiving secondary-side resonant coil of the mobile phone 2A is controlled to be lower (or higher) to make a shift from the resonance point of the power receiving secondary-side resonant coil that maximizes the efficiency of electric power reception.

That is, as indicated by the arrow MA in FIG. 9B, intentionally shifting the resonance conditions (shifting the capacitance $C_A$) reduces the Q factor so that the received electric power LLA of the mobile phone 2A can be gradually decreased from 27.5 W at the resonance point (P0) and, for example, set to a power requirement of 5 W.

In this case, most of electric power that is not received by the mobile phone 2A becomes electric power received by the notebook computer 2B. That is, obviously, the received electric power LLB of the notebook computer 2B increases in response to a decrease of received electric power LLA of the mobile phone 2A, and the overall efficiency LL0 of electric power transmission in the wireless power transmission system does not decrease substantially.

In this manner, changing the resonance conditions and, specifically, changing the capacitance value (capacitance $C_A$) of the resonant capacitor (the capacitor) 212 of the power receiver 2A may adjust coupling. As a result it becomes possible to control the received power to be a desired distribution ratio.

Importantly, even when the efficiency of the power receiver 2A is reduced, of which the resonance conditions have been changed, the entire efficiency of electric power transmission and reception of the system is maintained nearly constant, and the electric power to the power receiver 2B increases by the amount of reduction in electric power having reached the power receiver 2A. As a result, obviously, compared to single-body power supply to only one of the power receivers 2A and 2B, received electric power may be distributed at a desired ratio while electric power is supplied to the entire system (both the power receivers 2A and 2B) at nearly the same efficiency.

Next, a three-dimensional wireless power transmission system will be described. FIG. 10A to FIG. 11C are diagrams for describing one example of a three-dimensional wireless power transmission method for a plurality of (two) power receivers. For the sake of simplicity, although FIG. 10A to FIG. 11C depict only one power transmitter 1A and two power receivers 2A and 2B, the same applies when a plurality of power transmitters and three or more power receivers are used.

Figure 10A:
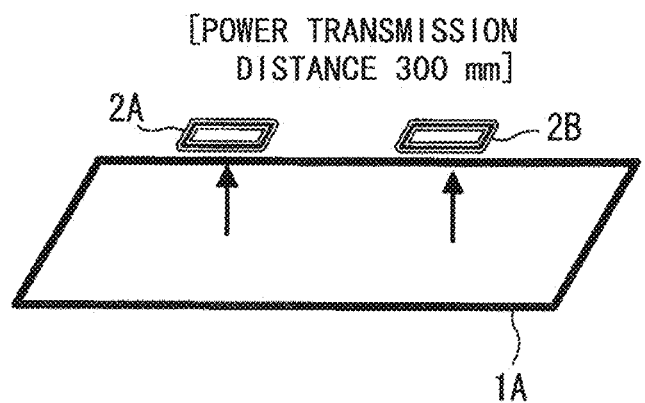
FIG. 10A is a diagram (1) for describing one example of a three-dimensional wireless power transmission method for a plurality of power receivers.
Figure 10B:
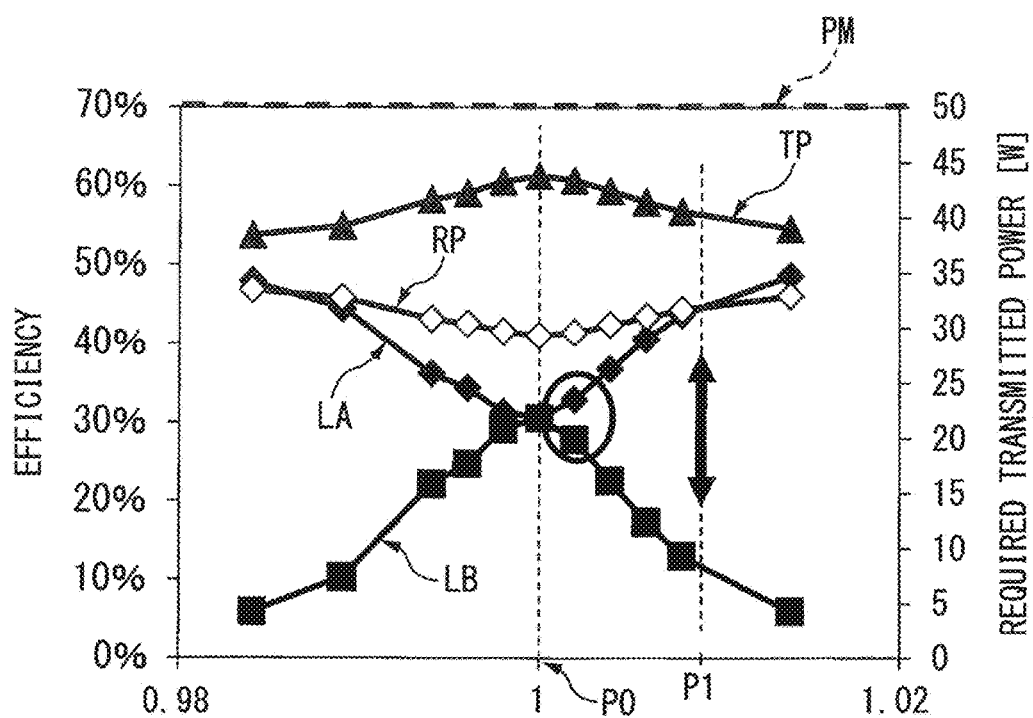
FIG. 10B is a diagram (2) for describing one example of the three-dimensional wireless power transmission method for the plurality of power receivers.
Figure 11A:
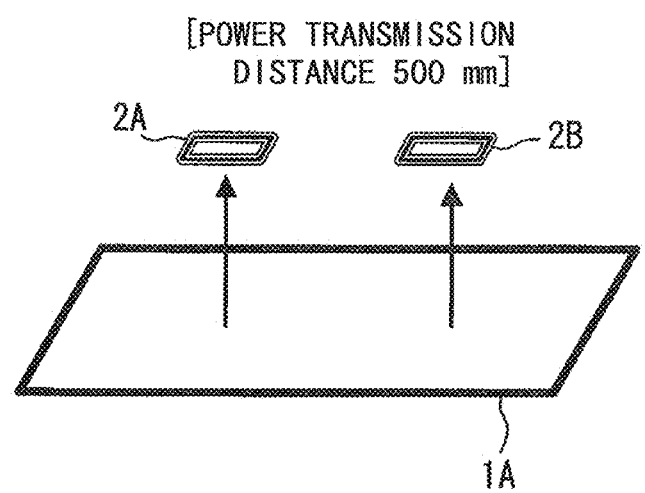
FIG. 11A is a diagram (4) for describing one example of the three-dimensional wireless power transmission method for a plurality of power receivers.
Figure 11B:
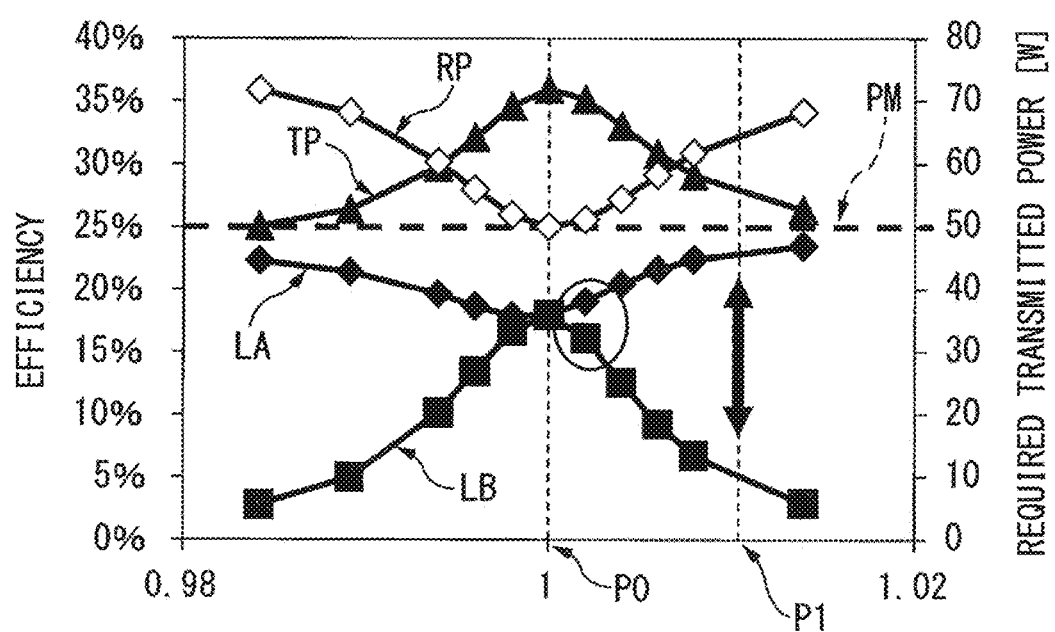
FIG. 11B is a diagram (5) for describing one example of the three-dimensional wireless power transmission method for the plurality of power receivers.

Here, FIG. 10A to FIG. 10C depict the case where the distance from the power transmitter 1A to the two power receivers 2A and 2B is 300 mm, and FIG. 11A to FIG. 11C depict the case where the distance from the power transmitter 1A to the two power receivers 2A and 2B is 500 mm.

Referring to FIGS. 10B and 11B, reference sign LA denotes the efficiency of electric power reception of the power receiver 2A; LB denotes the efficiency of electric power reception of the power receiver 2B; PM denotes the transmitted electric power (maximum power transmission output) that can be output from the power transmitter 1A; RP denotes the required transmitted power; and TP denotes the overall efficiency of electric power reception (overall efficiency).

Further, the reference sign P0 denotes the case where electric power is transmitted at a ratio between the power requirements of the power receivers 2A and 2B of 1:1 (9 W:9 W); and the reference sign P1 denotes the case where electric power is transmitted at a ratio between the power requirements of the power receivers 2A and 2B of 2:1 (12 W:6 W). Note that FIG. 10B and FIG. 11B are diagrams with normalization assuming that the power ratio of 1:1 is "1.00."

That is, assuming that the electric power transmitted to the two power receivers 2A and 2B is 18 W, the case where the power requirements of both the power receivers 2A and 2B are 9 W and the case where the power requirement of the power receiver 2A is 12 W and the power requirement of the power receiver 2B is 6 W will be considered hereinafter. Note that the maximum power transmission output of the power transmitter A is assumed to be limited to 50 W in accordance with, for example, the specifications of the power transmitter, regulations stipulated in for radio waves, or the like.

A case where the distance from the power transmitter 1A to the two power receivers 2A and 2B is 300 mm (they are relatively close to each other) will be considered below with reference to FIG. 10A to FIG. 10C. First, when the power requirements of both the power receivers 2A and 2B to be simultaneously supplied with electric power are 9 W, i.e., when electric power is transmitted at a power ratio of 1:1 (9 W:9 W), the efficiencies of electric power reception of both the power receivers 2A and 2B are assumed to be, for example, 30.1% (the overall efficiency (TP) is assumed to be 60.2%).

Then, as illustrated in P0 of FIG. 10B and FIG. 10C, setting the power transmission output of the power transmitter 1A to 29.9 W allows each of the power receivers 2A and 2B to receive an electric power of 29.9×0.301≈9 W.

When the power requirement of the power receiver 2A is 12 W and the power requirement of the power receiver 2B is 6 W, i.e., when electric power is transmitted at a power ratio of 2:1 (12 W:6 W), the resonance point of the power receiving secondary-side resonant coil of the power receiver 2B is shifted, as described with reference to FIG. 9A and FIG. 9B.

That is, electric power is simultaneously supplied to the power receivers 2A and 2B by shifting the resonance point of the power receiving secondary-side resonant coil of the power receiver 2B to control the power distribution ratio to decrease the efficiency of electric power reception of the power receiver 2B (increase the efficiency of electric power reception of the power receiver 2A).

Specifically, as illustrated in P1 of FIG. 10B and FIG. 10C, the resonance point of the power receiving secondary-side resonant coil of the power receiver 2B is shifted to set the efficiency of electric power reception of the power receiver 2A to be 39.5% and the efficiency of electric power reception of the power receiver 2B to be 19.7%. At this time, the overall efficiency (TP) is 59.2%.

As illustrated in FIG. 10C, setting the power transmission output of the power transmitter 1A to 30.4 W allows the power receiver 2A to receive an electric power of 30.4×0.395≈12 W and the power receiver 2B to receive an electric power of 30.4×0.197≈6 W.

Here, when the distance from the power transmitter 1A to the two power receivers 2A and 2B is 300 mm, the required transmission power RP of the power transmitter 1A is lower than a maximum power transmission output of 50 W for both power transmission at an electric power ratio of 1:1 (29.9 W) and power transmission at an electric power ratio of 2:1 (30.4 W).

In addition, the overall efficiency TP is substantially constant in power transmission at the electric power ratio of 1:1 (60.2%) and power transmission at the electric power ratio of 2:1 (59.2%). Therefore, when the distance from the power transmitter 1A to the two power receivers 2A and 2B is 300 mm (they are relatively close to each other), both power transmission at the electric power ratio of 1:1 and power transmission between the electric power ratio of 2:1 may be implemented by simultaneous power supply.

Next, a case where the distance from the power transmitter 1A to the two power receivers 2A and 2B is 500 mm (they are relatively distant from each other) will be considered next with reference to FIG. 11A to FIG. 11C. First, when the power requirements of both the power receivers 2A and 2B to be simultaneously supplied with power are 9 W, i.e., when electric power is transmitted at an electric power ratio of 1:1 (9 W:9 W), the efficiencies of electric power reception of both the power receivers 2A and 2B are assumed to be, for example, 18.2% (the overall efficiency (TP) is assumed to be 36.4%).

Then, as illustrated in P0 of FIG. 11B and FIG. 11C, setting the power transmission output of the power transmitter 1A to 49.5 W allows each of the power receivers 2A and 2B to receive electric power of 49.5×0.182≈9 W. In this case, the required transmitted power RP (49.5 W) of the power transmitter 1A is lower than a maximum power transmission output of 50 W, and electric power may be simultaneously supplied to the power receivers 2A and 2B.

Next, when the power requirement of the power receiver 2A is 12 W and the power requirement of the power receiver 2B is 6 W (the power ratio is 2:1), the resonance point of the power receiving secondary-side resonant coil of the power receiver 2B is shifted to control the power distribution ratio to decrease the efficiency of electric power reception of the power receiver 2B (increase the efficiency of electric power reception of the power receiver 2A), as described above.

Specifically, as depicted in P1 of FIG. 11B and FIG. 11C, the resonance point of the power receiving secondary-side resonant coil of the power receiver 2B is shifted such that the efficiency of electric power reception of the power receiver 2A is 21.2% and the efficiency of electric power reception of the power receiver 2B is 10.6%. At this time, the overall efficiency (TP) is 31.8%.

However, to set the received electric power of the power receiver 2A to be 12 W (≈56.6×0.212), the required transmitted power RP of the power transmitter 1A is set to 56.6 W, which is higher than a maximum power transmission output of 50 W. It is therefore difficult to simultaneously supply electric power to the two power receivers 2A and 2B.

Note that when the power transmission output of the power transmitter 1A is not limited to 50 W in accordance with, for example, the specifications of the power transmitter or regulations stipulated for radio waves, the power transmitter 1A may preferably have its power transmission output increased to tolerate a required transmitted power RP of 56.6 W.

In the following, a wireless power transmission method, a power transmitter, and a power transmission method according to the embodiment will be described in detail with reference to the accompanying drawings. Note that the embodiment is applicable to a wireless power transmission system that uses at least one power transmitter to wirelessly transmit electric power to a plurality of power receivers.

An example in which electric power is wirelessly transmitted by using magnetic field resonance (magnetic field sympathetic vibration) from one power transmitter to a plurality of (two to five) power receivers will be described in the following. However, according to the embodiment, electric power may be transmitted by two or more power transmitters, as described with reference to FIG. 7A to FIG. 7C. Further, the embodiment is similarly applicable to a wireless power transmission system that uses electric field resonance (electric field sympathetic vibration) instead of magnetic field resonance.

In the wireless power supply system, the power transmitter, and the power transmission method of the embodiment, kQ (kQ value) is employed as an evaluation index for wireless power transmission (wireless power supply). Here, k (k value) indicates the degree of coupling of electromagnetic fields, and the larger the k value, the higher the degree of coupling. The k value is an example of a coupling coefficient. Further, Q (Q factor) indicates the degree of losses in an electromagnetic field, and the larger the Q factor, the lower the degree of loss.

That is, kQ is represented by the following formula (1). Here, Qt is the Q factor of a power transmitter and Qr is the Q factor of a power receiver.

$$kQ = k\sqrt{Qt \cdot Qr} \qquad (1)$$

Further, k is represented by the following formula (2). Here, Mtr is the mutual inductance between a power transmitter and a power receiver, Lt is the self-inductance of the power transmitter, and Lr is the self-inductance of the power receiver.

$$k = \sqrt{\frac{Mtr}{Lt \cdot Lr}} \qquad (2)$$

Further, Q is represented by the following formula (3). Here, ω represents the angular frequency, Rt represents losses in the resonant coil of the power transmitter, and Rr represents losses in the resonant coil of the power receiver.

$$Qt = \frac{\omega Lt}{Rt}, \quad Qr = \frac{\omega Lr}{Rr} \qquad (3)$$

Figure 12:
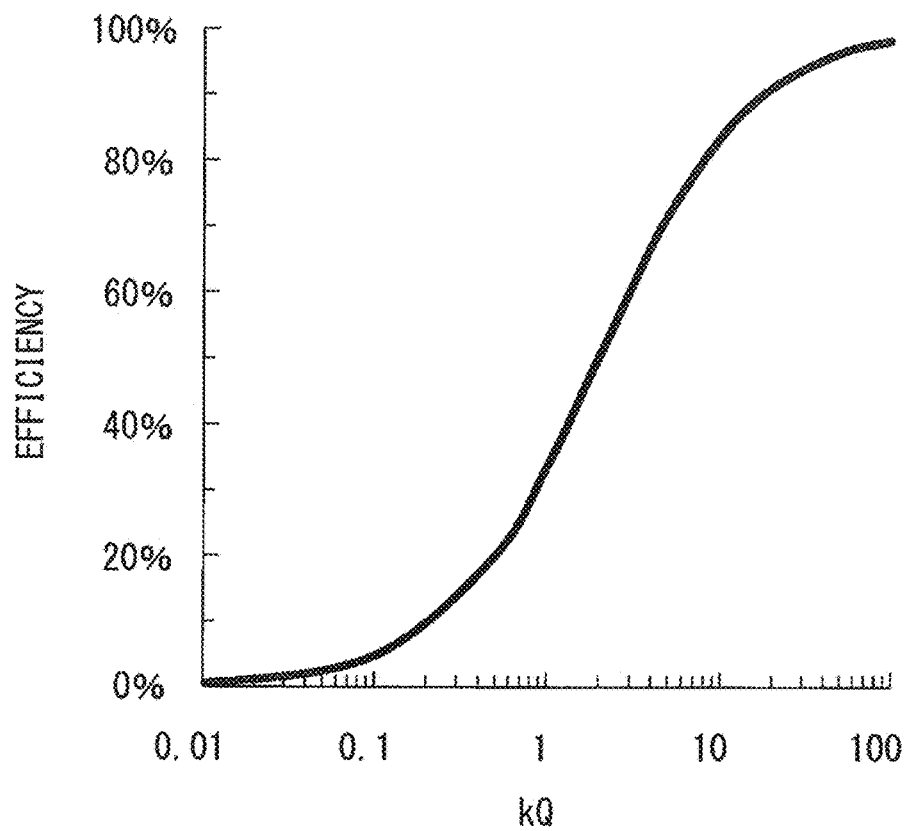
FIG. 12 is a diagram for describing an evaluation index in the wireless power transmission method according to the embodiment.

FIG. 12 is a diagram for describing an evaluation index in the wireless power transmission method of the embodiment and illustrates a relationship between the kQ value (the product of k and Q) and the ideal efficiency in one power transmitter and one power receiver.

FIG. 12 represents the kQ value on the abscissa and the efficiency on the ordinate. That is, according to the embodiment, the kQ value for one power transmitter and one power receiver representing characteristics as illustrated in FIG. 12, for example, is applied to electric power transmission between at least one power transmitter and at least two (a plurality of) power receivers.

In, for example, designing a wireless power supply system, a kQ value is possible as an index for determining the efficiency of electric power transmission. Here, as illustrated in FIG. 12, in, for example, wireless power supply at Power Transmission:Power Reception=1:1, a theoretical relationship is established for the efficiency and the kQ value, and a theoretical maximum efficiency of electric power reception may be estimated by evaluating the kQ value.

FIG. 13A to FIG. 14B are diagrams for describing a first example of a wireless power transmission method and for describing a wireless power transmission method in a three-dimensional wireless power transmission method of the first example.

Although FIG. 13A to FIG. 14B illustrate only one power transmitter 1A and two power receivers 2A and 2B for the sake of simplicity, the same applies to a plurality of power transmitter and three or more power receivers.

Figure 13A:
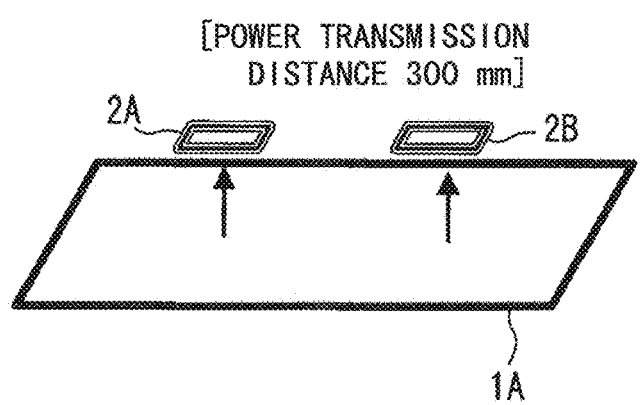
FIG. 13A is a diagram (1) for illustrating a first example of the wireless power transmission method.
Figure 13B:
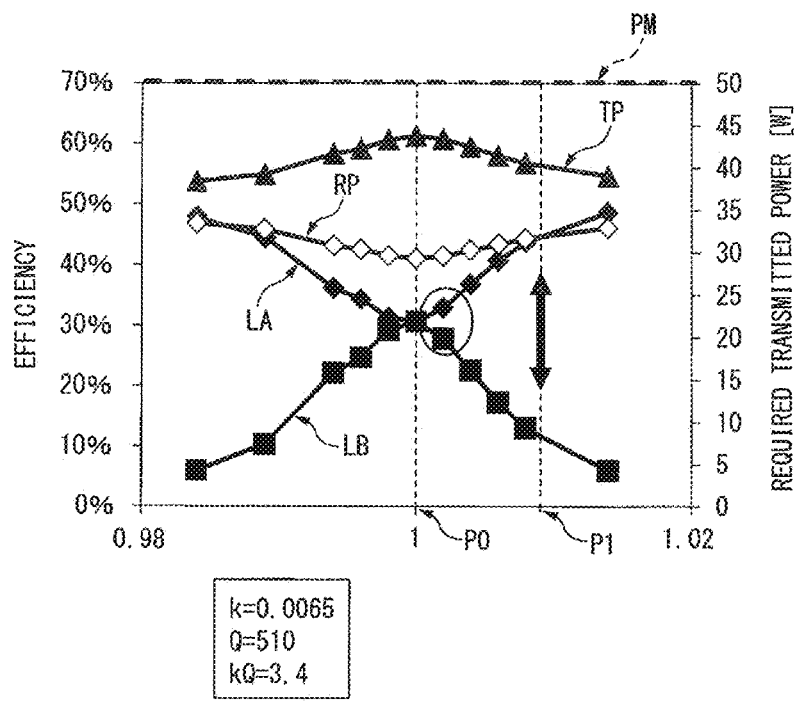
FIG. 13B is a diagram (2) for illustrating the first example of the wireless power transmission method.
Figure 14A:
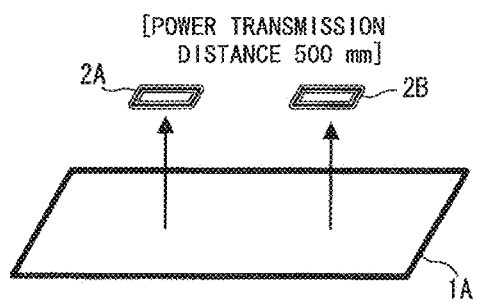
FIG. 14A is a diagram (3) for illustrating the first example of the wireless power transmission method.

Here, FIG. 13A and FIG. 13B illustrate a case where the distance from the power transmitter 1A to the two power receivers 2A and 2B is 300 mm and correspond to FIG. 10A and FIG. 10B described above. Further, FIG. 14A and FIG. 14B illustrate a case where the distance from the power transmitter 1A to the two power receivers 2A and 2B is 500 mm and correspond to FIG. 11A and FIG. 11B described above.

Figure 14B:
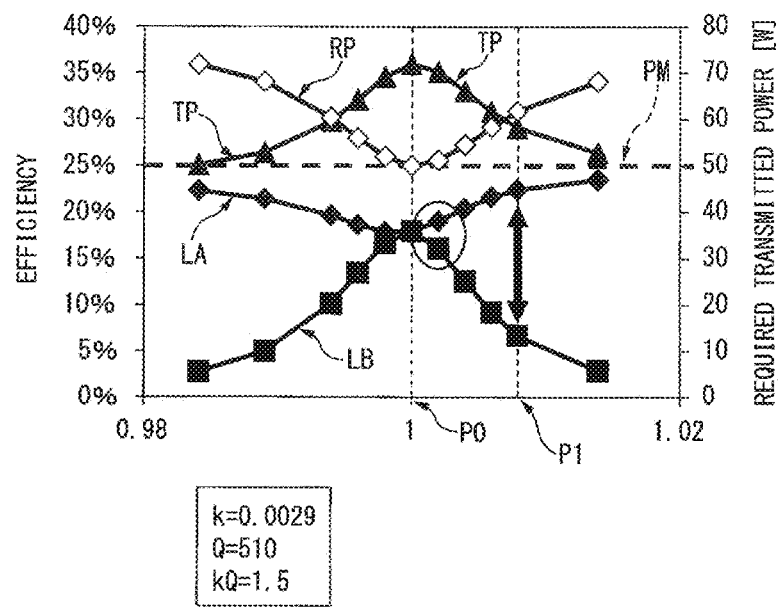
FIG. 14B is a diagram (4) for illustrating the first example of the wireless power transmission method.

Referring to FIG. 13B and FIG. 14B, the reference sign LA denotes the efficiency of electric power reception of the power receiver 2A; the reference sign LB denotes the efficiency of electric power reception of the power receiver 2B; the reference sign PM denotes the maximum power transmission output of the power transmitter 1A; the reference sign RP denotes the required transmitted power; and the reference sign TP denotes the overall efficiency.

Further, the reference sign P0 denotes a case where electric power is transmitted at a ratio between the power requirements of the power receivers 2A and 2B of 1:1 (9 W:9 W); and the reference sign P1 denotes a case where electric power is transmitted at a ratio between the power requirements of the power receivers 2A and 2B of 2:1 (12 W:6 W). Note that FIG. 13B and FIG. 14B are diagrams with normalization assuming that the power ratio of 1:1 is "1.00."

Here, because FIG. 13A and FIG. 13B correspond to FIG. 10A and FIG. 10B described above and FIG. 14A and FIG. 14B correspond to FIG. 11A and FIG. 11B described above, repetitive descriptions thereof will be omitted as appropriate.

First, as illustrated in FIG. 13A and FIG. 13B, when the distance from the power transmitter 1A to the two power receivers 2A and 2B is 300 mm, the k value and the Q factor are k=0.0065 and Q=510. In this case, the kQ value may be obtained as kQ=0.0065×510=3.4.

Next, as depicted in FIG. 14A and FIG. 14B, when the distance from the power transmitter 1A to the two power receivers 2A and 2B is 500 mm, the k value and the Q factor are k=0.0029 and Q=510.

That is, because the distance from the power transmitter 1A to the power receivers 2A and 2B becomes longer from 300 mm to 500 mm, the degree of coupling of magnetic fields (electromagnetic fields) becomes lower and the k value reduces from 0.0065 to 0.0029. Note that the Q factor remains at 510 because the degree of losses in a magnetic field (electromagnetic field) does not change.

Accordingly, as depicted in FIG. 14A and FIG. 14B, when the distance from the power transmitter 1A to the two power receivers 2A and 2B is 500 mm, the kQ value may be obtained as kQ=0.0029×510=1.5.

Figure 15A:
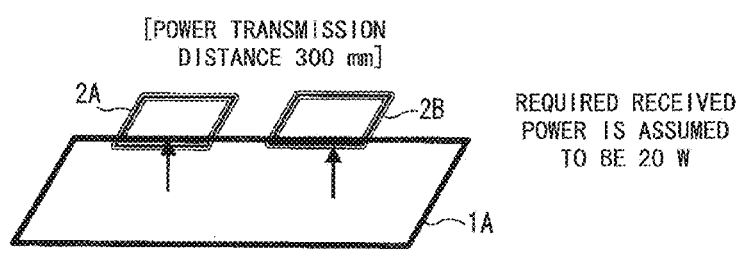
FIG. 15A is a diagram (1) for illustrating a second example of the wireless power transmission method.
Figure 15B:
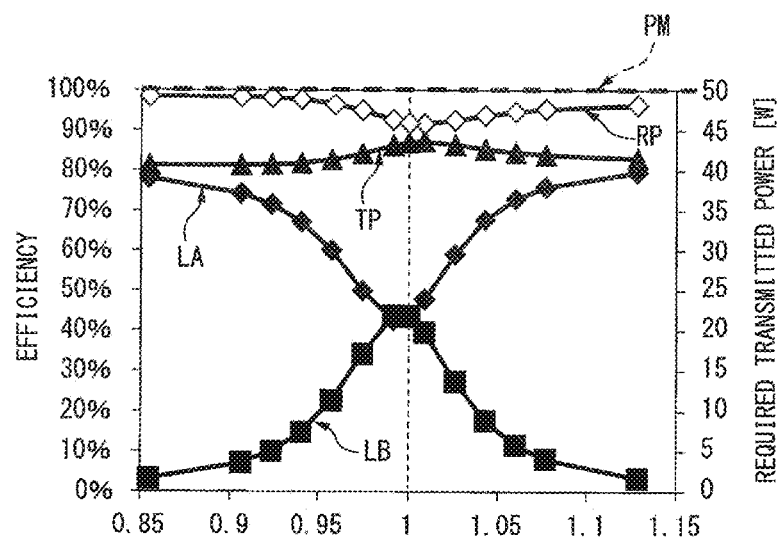
FIG. 15B is a diagram (2) for illustrating the second example of the wireless power transmission method.
Figure 16A:
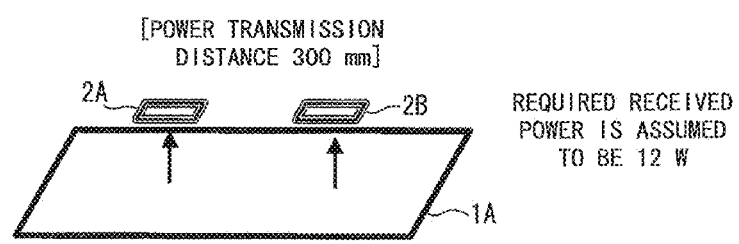
FIG. 16A is a diagram (3) for illustrating the second example of the wireless power transmission method.
Figure 16B:
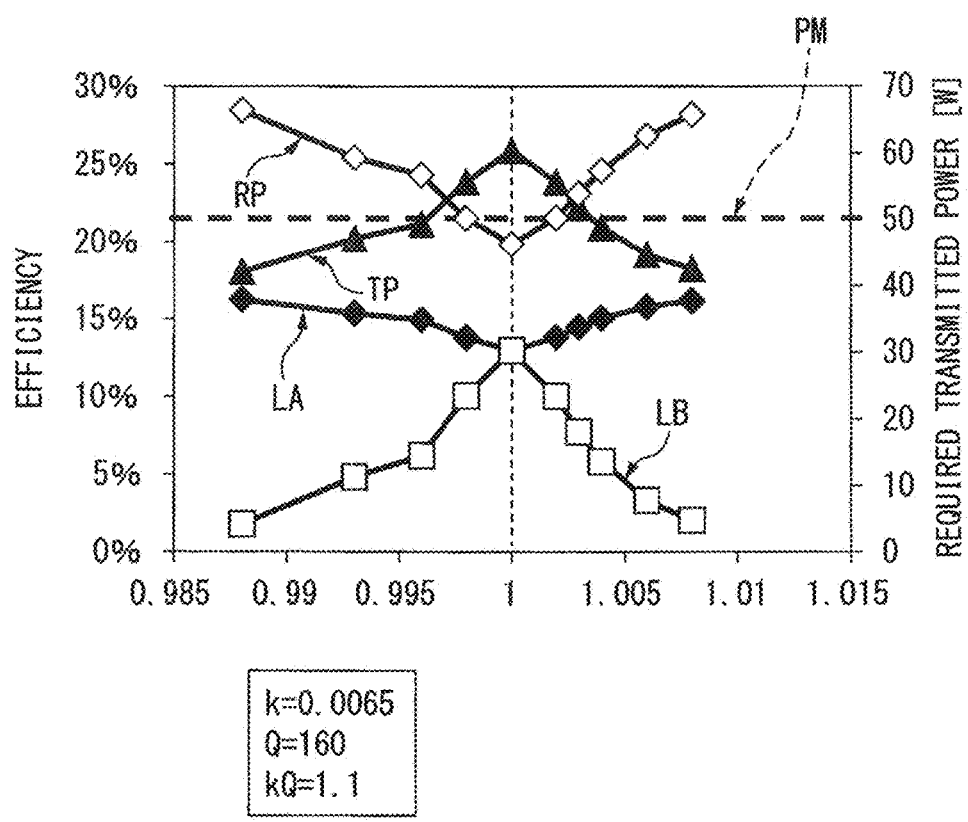
FIG. 16B is a diagram (4) for illustrating the second example of the wireless power transmission method.

FIG. 15A to FIG. 16B are diagrams for describing a wireless power transmission method. FIGS. 15A and 15B, and FIGS. 16A and 16B, both depict a case where the distance from the power transmitter 1A to the two power receivers 2A and 2B is 300 mm, but differing Q factors. Note that FIG. 15B and FIG. 16B are diagrams with normalization assuming that the power ratio of 1:1 is "1.00."

First, referring to FIG. 15A and FIG. 15B, the self-inductances (Lr) of the power receiving secondary-side resonant coils in the power receivers 2A and 2B are high, and the k value and the Q factor are k=0.026 and Q=600. In this case, the kQ value may be obtained as kQ=0.026×600=15.3.

Referring to FIG. 16A and FIG. 16B, the self-inductances (Lr) of the power receiving secondary-side resonant coils in the power receivers 2A and 2B are low, and the k value and the Q factor are k=0.0065 and Q=160. In this case, the kQ value may be obtained as kQ=0.0065×160=1.1.

Note that for example, the k value may be calculated based on specification information defined between the power transmitter 1A and the power receiver 2A or 2B and a relative positional relationship between the power transmitter 1A and the power receiver 2A or 2B, and the Q factor is predefined depending on each power receiver.

Figure 17:
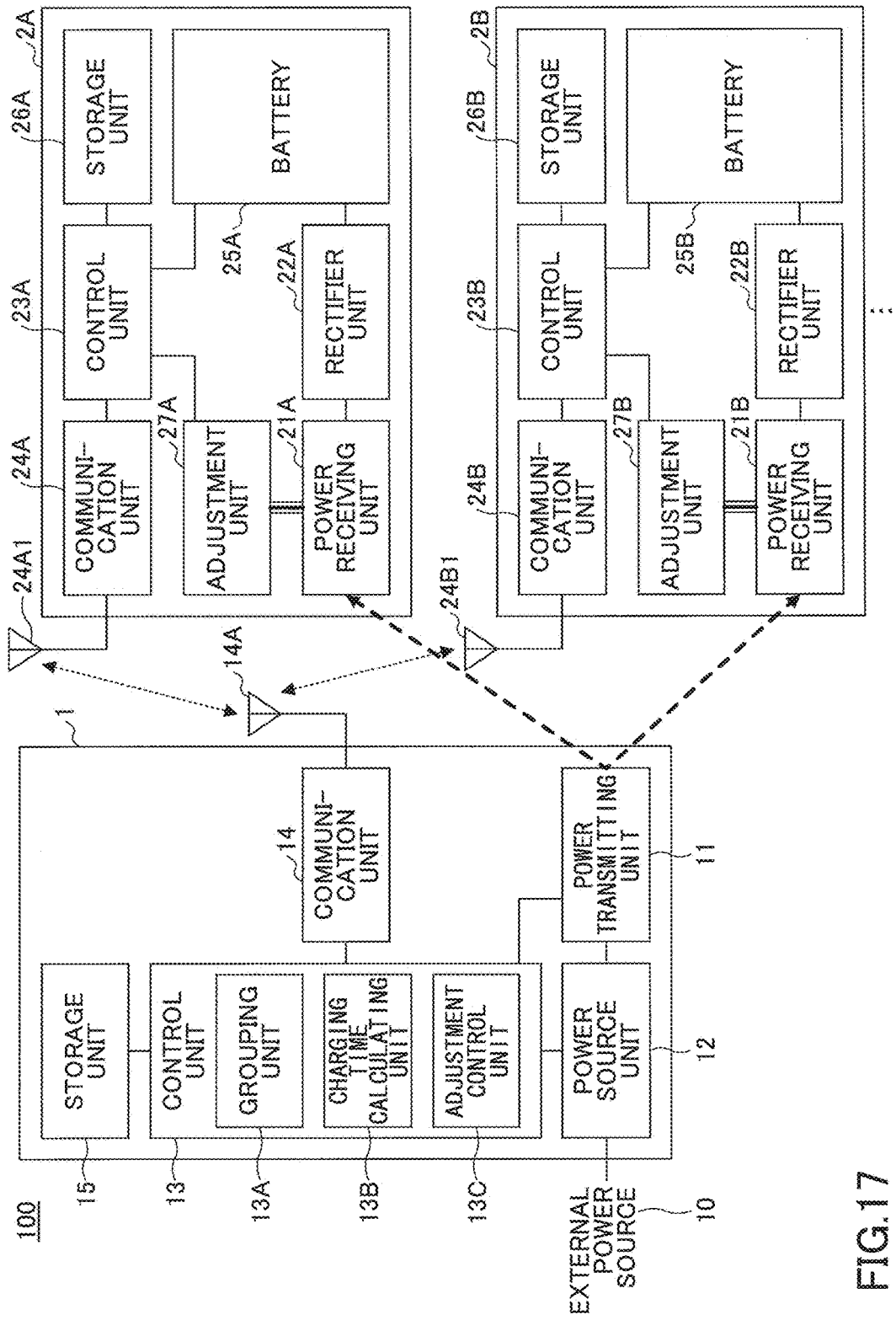
FIG. 17 is a diagram illustrating one example of a wireless power supply system according to the embodiment.

FIG. 17 is a diagram illustrating one example of a wireless power supply system 100 of the embodiment.

The wireless power supply system 100 includes one power transmitter 1 and a plurality of power receivers 2A and 2B. Although FIG. 17 illustrates two power receivers 2A and 2B, the wireless power supply system 100 may further include power receivers having a configuration similar to that of the power receivers 2A and 2B. Note that in the following description, the power receivers 2A and 2B and other power receivers are simply referred to as the power receiver(s) 2 unless otherwise specifically provided.

The power transmitter 1 includes a wireless power transmitting unit 11, a power source unit 12, a control unit 13, a communication unit 14, and a storage unit 15.

The power source unit 12 generates high frequency electric power and, for example, corresponds to the power source unit 12 described in FIG. 3. The power source unit 12 has a specific power source impedance. For example, the power source unit 12 may be a power source such as a constant voltage source whose output impedance is matched to 50Ω or a Hi-ZΩ power source (constant current source) having a high output impedance. Note that the power source unit 12 receives electric power supplied from an external power source 10.

The control unit 13 controls the power transmitting unit 11, and the communication unit 14 can communicate with each power receiver. The communication by the communication unit 14 may use, for example, a DSSS wireless LAN system based on IEEE 802.11b or use Bluetooth (registered trademark). An antenna 14A is coupled to the communication unit 14.

For example, a Central Processing Unit (CPU) chip may be used as the control unit 13. The control unit 13 includes a grouping unit 13A, a charging time calculating unit 13B, and an adjustment control unit 13C.

The grouping unit 13A performs a process of grouping the plurality of power receivers 2 based on kQ values of the plurality of power receivers 2.

The charging time calculating unit 13B uses a k value and a rated output (rating capacity (Watt Hour)) of the power receiver 2 to calculate a time required to charge the power receiver 2 (charging time). From a k value and a Q factor, the charging time calculating unit 13B can obtain an efficiency of electric power reception of the power receiver 2. Because Q factors of the respective power receiver 2 are transmitted to the power transmitter 1 through communications, the charging time calculating unit 13B can use the rated outputs and the k values of the power receivers 2 to calculate the charging times. Further, the charging time calculating unit 13B calculates a total charging time that represents a total of charging times for one or more power receivers 2 included in each group.

The adjustment control unit 13C transmits, to the power receiver 2 via the communication 14, a command to adjust the adjustment unit 27.

The wireless power transmitting unit 11 corresponds to a coil in a case of magnetic field resonance, and converts high frequency electric power supplied from the power source unit 12 into a magnetic field.

The power receivers 2A and 2B respectively include power receiving units 21A and 21B, rectifier units 22A and 22B, control units 23A and 23B, communication units 24A and 24B, batteries 25A and 25B, storage units 26A and 26B, and adjustment units 27A and 27B.

The control units 23A and 23B are devices that control the power receivers 2A and 2B, and for example, CPU chips may be used as the control units 23A and 23B.

The communication units 24A and 24B are devices that implement wireless communications between the power transmitter 1 and power receivers 2A and 2B. As described above, for example, communication circuits that perform communications by a wireless LAN or Bluetooth (registered trademark) may be used as the communication units 24A and 24B. Antennas 24A1 and 24B1 are respectively coupled to the communication units 24A and 24B.

Each of the power receiving units 21A and 21B includes a secondary-side resonant coil 21a and converts wirelessly transmitted electric power into an electric current. The rectifier units 22A and 22B convert the AC current obtained from the power receiving units 21A and 21B into direct current so as to be usable in battery charging or in a main body of the device.

The storage units 26A and 26B are memories that store information such as information about grouping and information that represents power requirements of the power receivers 2A and 2B. The storage units 26A and 26B may be internal memories of CPU chips used as the control units 23A and 23B. Note that the power requirements are electric powers required for charging the power receivers 2A and 2B.

The adjustment units 27A and 27B respectively adjust angles of the power receiving units 21A and 21B with respect to the power receivers 2A and 2B. That is, each of the adjustment units 27A and 27B adjusts the angle of the secondary-side resonant coil 21a. Driving units such as motors are built in the adjustment units 27A and 27B that hold the power receiving units 21A and 21B. The adjustment units 27A and 27B drive the driving units to adjust the angles of the power receiving units 21A and 21B relative to the power receivers 2A and 2B.

The adjustment units 27A and 27B adjust the angles based on control signals, transmitted from the control unit 13 of the power transmitter 1 via the communication unit 14, the antenna 14A, the antennas 24A1 and 24B1 and the communication units 24A and 24B and received by the control units 23A and 23B of the power receivers 2A and 2B. Note that a specific configuration of each of the adjustment units 27A and 27B will be described later below with reference to FIG. 18.

As described above, the power transmitter 1 and the power receivers 2A and 2B perform communications via their respective communication units 14, 24A and 24B.

Here, through communication performed via the communication unit 14 of the power transmitter 1 and the communication unit 24A or 24B of the power receiver 2A or 2B, data representing received electric power of the power receiver 2A or 2B and the like is transmitted to the power transmitter 1. Further, various signals are communicated such as control signals for adjusting the adjustment units 27A and 27B to adjust the k values, commands that represent grouping based on the k values, and commands to turn on/off electric power reception.

Specifically, for example, via the communication unit 14 of the power transmitter 1 and the communication units 24A and 24B of the power receivers 2A and 2B, the Q factors in the respective power receivers 2A and 2B are communicated to the power transmitter 1 that performs control of wireless electric power transmission.

Note that a transmission system of electric power between the wireless power transmitting unit 11 and the power receiving unit 21A or 21B is not limited to a system using magnetic field resonance, but may use a system using electric field resonance, electromagnetic induction, or electric field induction, for example.

FIG. 18A to 18C are diagrams illustrating the power receiver 2. The power receiver 2 illustrated in FIGS. 18A to 18C is a smartphone terminal device, for example. As illustrated in FIG. 18B, a camera 29 is provided on a side opposite to a side where a display and a touch panel are provided.

The power receiver 2 includes the adjustment unit 27 for adjusting the angle of the secondary-side resonant coil 21a with respect to the power receiver 2. The adjustment unit 27 includes a hinge mechanism 28 that adjusts the angle of the secondary-side resonant coil 21a having a rectangular ring shape with respect to the power receiver 2 and includes a motor 28A that drives the hinge mechanism 28.

The adjustment unit 27 can adjust the angle of the secondary-side resonant coil 21a from a state in which the secondary-side resonant coil 21a is housed in the power receiver 2 as illustrated in FIG. 18A to a state where the secondary-side resonant coil 21a stands with respect to the power receiver 2 as illustrated in FIG. 18C.

Upon receiving, by the communication unit 24, an adjustment control signal transmitted from the power transmitter 1 via the communication unit 14, the power receiver drives the adjustment unit 27.

Figure 19:
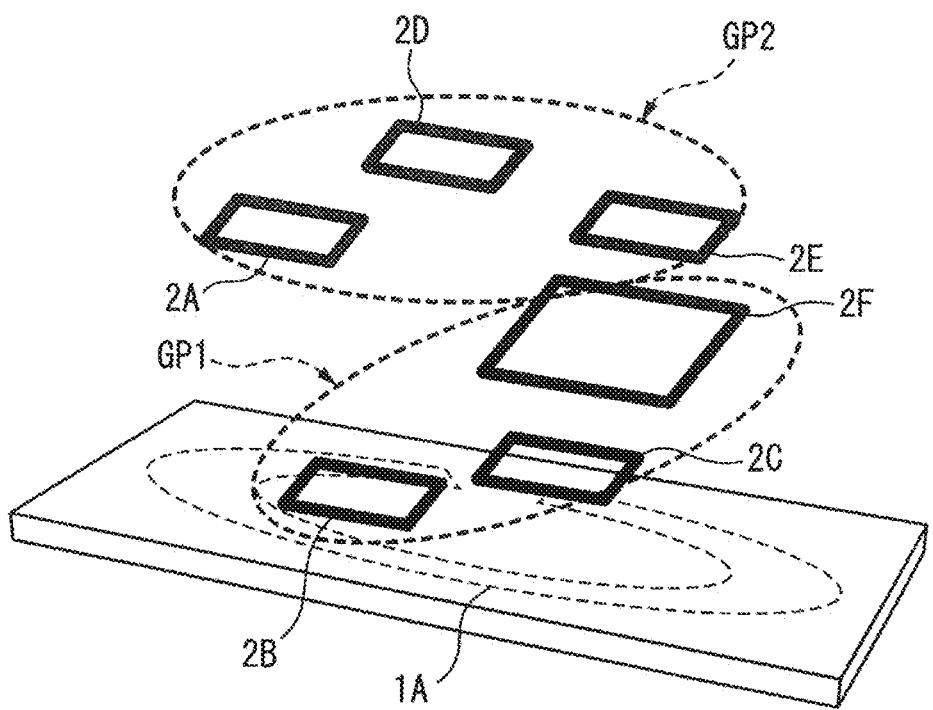
FIG. 19 is a diagram describing grouping according to a wireless power transmission method of the embodiment.

Next, a case will be described of grouping three or more power receivers based on kQ values. FIG. 19 is a diagram describing grouping according to a wireless power transmission method of the embodiment. Although FIG. 19 illustrates one power transmitter 1A and six power receivers 2A to 2F, this is merely an example, and various cases may occur, as a matter of course.

As illustrated in FIG. 19, in the wireless power transmission method of the embodiment, the kQ values of the six power receivers 2A to 2F are evaluated and used for grouping. First, all the power receivers 2A to 2F are individually evaluated.

For example, when the kQ value of the power receiver 2A is evaluated, only the power receiver 2A is turned on and the other power receivers 2B to 2F are turned off. For example, the switch 213 in the secondary-side resonant coil 21a illustrated in FIG. 5A is turned off. Then, the k value is measured based on the received electric power of the power receiver 2A. Then, the k value is multiplied by the Q factor to calculate the kQ value. Similarly for the power receivers 2B to 2F, the kQ values are calculated by turning on only electric power reception of a power receiver to be measured and turning off electric power reception of the other power receivers to calculate the k values.

For example, in FIG. 19, the power receivers 2B, 2C and 2F are grouped into a group GP1, and the power receivers 2A, 2D and 2E are grouped into a group GP2.

Figure 20:
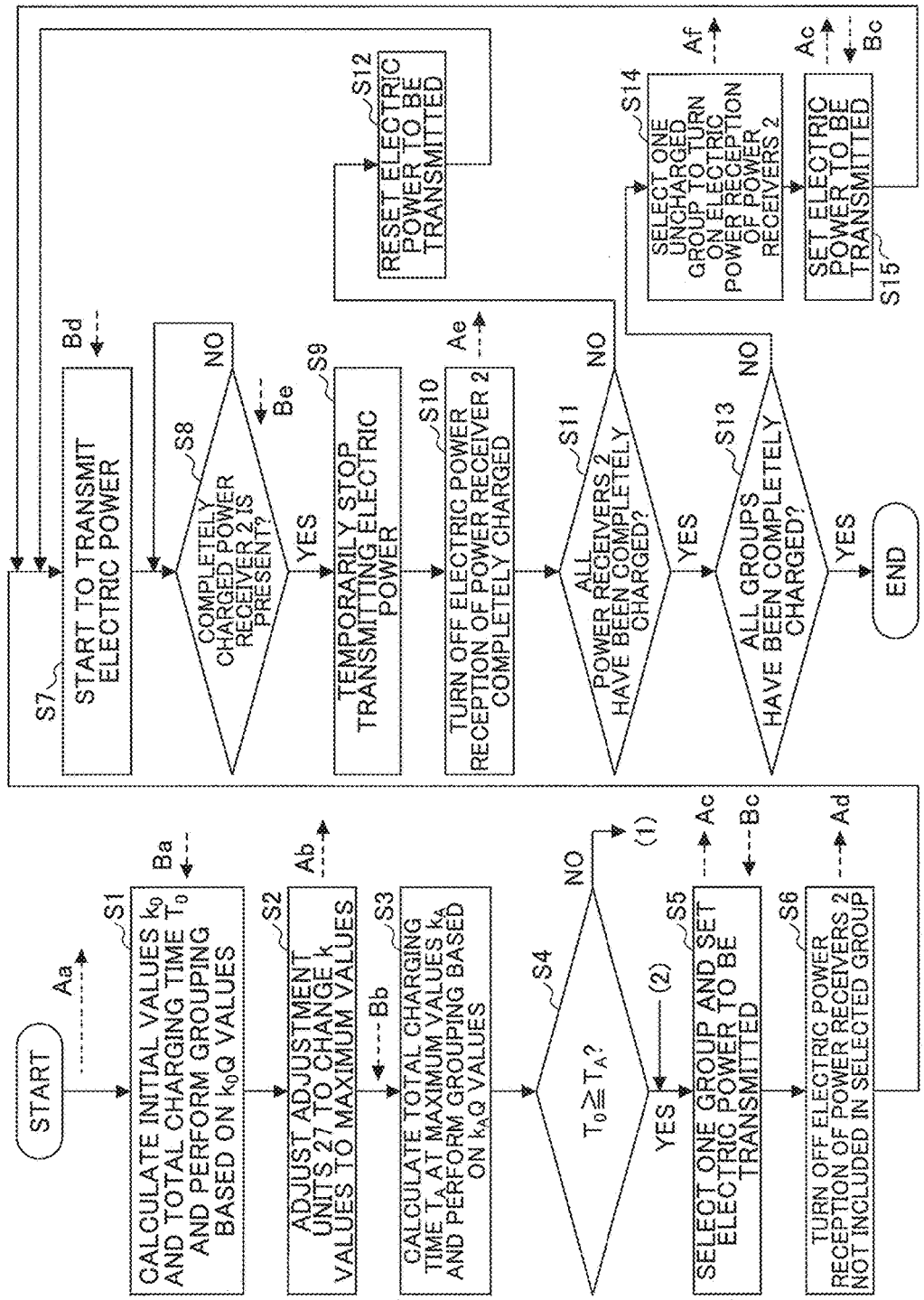
FIG. 20 is a flowchart illustrating control contents of a power transmitter.
Figure 21:
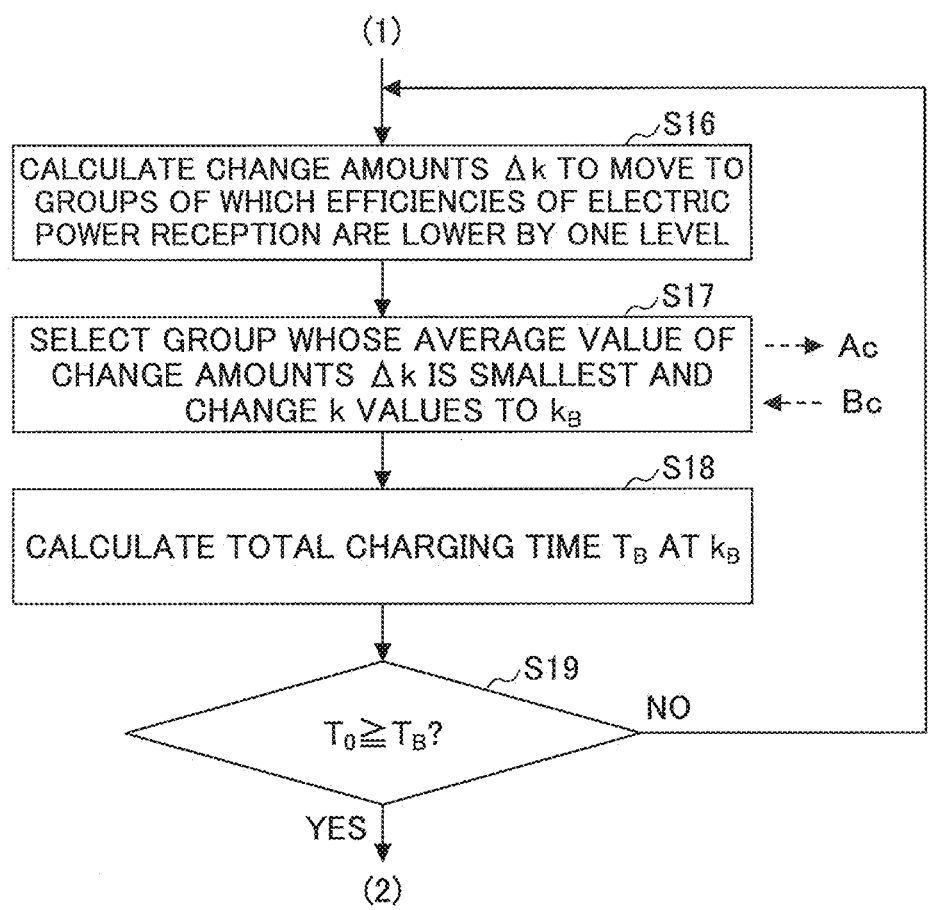
FIG. 21 is a flowchart illustrating control contents of the power transmitter.

FIG. 20 and FIG. 21 are a flowchart illustrating control contents of the power transmitter 1. FIG. 22 is a diagram illustrating data used for grouping. Here, a control process will be described inside the power transmitter 1 when the power transmitter 1 transmits electric power to the power receivers 2A and 2B in the wireless power supply system illustrated in FIG. 17. Although FIG. 17 illustrates the two power receivers 2A and 2B, the system may include three or more power receivers similar to the power receivers 2A and 2B in practice.

In the following, the power receiver 2A or 2B or another similar power receiver is simply referred to as the power receiver 2 as appropriate. In the following description, it is assumed that the power receiver 2 includes an adjustment unit 27 similar to the adjustment units 27A and 27B.

The power transmitter 1 transmits predetermined electric power to each power receiver 2 for performing test electric power transmission, and communicates with each power receiver 2 in step Aa. As a result, each power receiver 2 transmits, to the power transmitter 1, data that represents the received electric power and a rated output in step Ba.

The power transmitter 1 calculates initial values $k_0$ of the k values of the respective power receivers 2 and calculates an initial value $T_0$ of the total charging time, and performs grouping based on the $k_0Q$ values in step S1.

Here, for example, the $k_AQ$ values are converted into efficiencies of electric power reception to group the power receivers 2. As illustrated in FIG. 22, they are grouped into groups G1 to G10, where efficiencies η (%) of electric power reception are 90≤η<100, 80≤η<90, 70≤η<80, 60≤η<70, 50≤η<60, 40≤η<50, 30≤η<40, 20≤η<30, 10≤η<20, and 0≤η<10. That is, the efficiencies of electric power reception are divided for each 10% such that they are grouped into 10 groups.

Note that the kQ values are converted into the efficiencies η of electric power reception by the following formula (4). Hence, when power receivers are grouped based on their kQ values, the power receivers are grouped by using the following formula (4) to convert the kQ values into the efficiencies η of electric power reception.

$$\eta = \frac{(kQ)^2}{\left(1 + \sqrt{1 + (kQ)^2}\right)^2} \quad (4)$$

The power transmitter 1 transmits, to each power receiver 2, a change notification for adjusting the adjustment unit 27 of the power receiver 2 to change the k value to be the maximum value in step S2 and step Ab. As a result, each power receiver 2 drives the adjustment unit 27 to adjust the angle of the secondary-side resonant coil 21a to obtain an angle at which electric power to be received from the power transmitter 1 is the maximum.

Upon obtaining the angle at which electric power to be received from the power transmitter 1 is the maximum, each power receiver 2 sets the adjustment unit 27 to the angle, at which electric power to be received is the maximum, and transmits, to the power transmitter 1, a signal that represents the completion of setting in step Bb.

Upon receiving the signals transmitted in step Bb from the respective power receivers 2, the power transmitter 1 calculates the maximum values $k_A$ of the k values of the respective power receivers 2 and the total charging time $T_A$ to perform grouping based on the $k_AQ$ values in step S3. That is, the power receivers 2 are again grouped by using the efficiencies of electric power reception corresponding to the $k_AQ$ values.

The power transmitter 1 determines, with respect to the total charging times $T_0$ and $T_A$, whether $T_0 \geq T_A$ is satisfied in step S4.

Upon determining that $T_0 \geq T_A$ is satisfied (YES in step S4), the power transmitter 1 selects one group and sets electric power to be transmitted to one or more power receivers 2 included in the selected group in step S5.

Further, at this time, the power transmitter 1 transmits, to each power receiver 2 in the selected group, a command to change the k value to be the maximum value in step Ac, and receives, from each power receiver 2, a signal that represents that the k value has been changed to the maximum value in step Bc.

Here, it is preferable that the group selected in step S5 is a group such as a group for large kQ values or a group for the large number of power receivers 2. Here, for example, a group with the largest kQ value is selected.

Further, the electric power set in step S5 may be obtained by using the efficiencies of electric power reception and the rated outputs of the power receivers 2 included in the selected group.

In order not to transmit the electric power to power receivers 2 in one or more other groups that are not the group selected in step S5, the power transmitter 1 turns off, in step S6 and step Ad, electric power reception of the power receivers 2 in the other groups that are not the group selected in step S5.

A LC resonant circuit including the secondary-side resonant coil 21a may be turned off to turn off the electric power reception. Thus, for example, when the secondary-side resonant coil 21a includes the circuit configuration illustrated in FIG. 5A, the switch 213 may be turned off.

Note that in step S6 and step Ad, electric power reception of the power receivers 2 in the group selected in step S5 is turned on. For example, when the secondary-side resonant coil 21a includes the circuit configuration illustrated in FIG. 5A, the switch 213 may be turned on.

In step Bd, upon receiving from each power receiver 2 in the group selected in step S5, a signal that represents that the electric power reception is turned on and upon receiving, from each power receiver 2 in the other groups that are not the group selected in step S5, a signal that represents that the electric power reception is turned off, the power transmitter 1 starts to transmit the electric power in step S7.

The power transmitter 1 determines in step S8 whether there is a power receiver 2 that has been completely charged among the power receivers 2 in the group selected in step S5. When receiving in step Be a charging completion notification from a power receiver 2 completely charged, the power transmitter 1 may determine that there is a power receiver 2 that has been completely charged (YES in step S8).

Note that the process of step S8 is repeatedly executed until determining that there is a power receiver 2 completely charged (YES in step S8). Upon determining that there is a power receiver 2 completely charged (YES in step S8), the power transmitter 1 causes the flow to proceed to step S9.

The power transmitter 1 temporarily stops transmitting the electric power in step S9. This is because it is required to reset the electric power to be transmitted because there is a power receiver 2 completely charged in the group to which the electric power is transmitted.

In step S10 and step Ae, the power transmitter 1 turns off electric power reception of the power receiver 2 completely charged.

The power transmitter 1 determines whether all power receivers 2 have been completely charged in step S11. For example, the determination process of step S11 may be executed by using Identifications (IDs) of all the power receivers 2 included in the group selected in step S5.

Upon determining that all the power receivers 2 have not been completely charged (NO in step S11), the power transmitter 1 resets in step S12 the electric power to be transmitted. The power transmitter 1 may use the efficiencies of electric power reception and the rated outputs of one or more power receivers 2 remaining in the selected group to reset the electric power to be transmitted.

Upon completing the process of step S12, the flow returns to step S7. As a result, until the power transmitter 1 determines that all the power receivers 2 have been completely charged (YES in step S11), the process of steps S7 to S12 is repeatedly performed.

Upon determining that all the power receivers 2 have been completely charged (YES in step S11), the power transmitter 1 determines whether all groups have been completely charged in step S13. This is for charging the respective groups in order.

Upon determining that all the groups have not been completely charged (No in step S13), the power transmitter 1 selects one group, from among uncharged groups, to turn on electric power reception of one or more power receivers 2 in the selected group in step S14. Thereby, a command to turn on the electric power reception is transmitted from the power transmitter 1 to the power receivers 2 in the selected group in step Af.

The power transmitter 1 sets in step S15 the electric power to be transmitted to the power receivers 2 within the selected group.

Further, at this time, the power transmitter 1 transmits, to each power receiver 2 in the selected group, a command to change the k value to be the maximum value in step Ac, and receives, from each power receiver 2, a signal that represents that the k value has been changed to the maximum value in step Bc.

Upon completing the process of step S15, the power transmitter 1 returns the flow to step S7 to start transmitting the electric power.

As a result, when charging is performed for all the groups and the power transmitter 1 determines that all the groups have been completely charged (YES in step S13), the process series is completed (END).

Upon determining, with respect to the total charging times $T_0$ and $T_A$, that $T_0 \geq T_A$ is not satisfied (NO in step S4), the power transmitter 1 obtains, for respective groups of all the groups obtained by the grouping based on $k_A Q$ values in step S3, change amounts $\Delta k$ by which the k values are to be changed from maximum values $k_A$ to move to groups of which efficiencies of electric power reception are lower by one in step S16.

Here, changes of efficiencies of electric power reception, for changing the maximum efficiencies of electric power reception obtained by the maximum values $k_A$ to upper limit values of the groups one level below, may be converted, by use of the formula (4), into the change amounts $\Delta k$, by which the k values are to be changed from maximum values $k_A$.

For example, a change amount $\Delta k$ by which the k value is to be decreased from the maximum value $k_A$ is obtained such that power receivers 2 included in the group G1 illustrated in FIG. 22 can become included in the group G2. More specifically, for a power receiver 2 of which the efficiency of electric power reception is 92% when the k value is the maximum value $k_A$, a change amount $\Delta k$ of the k value required to decrease the efficiency of electric power to be less than 90%, which is the upper limit value of the group G2, is obtained.

The power transmitter 1 obtains, for all the power receivers 2 in all the groups, change amounts $\Delta k$ of the k values to calculate total values for the respective groups. Note that because the k values and the efficiencies of electric power reception can be considered to linearly change, the change amounts $\Delta k$ of the k values may be obtained by interpolation using the initial values $k_0$ of the k values, the efficiencies of electric power reception corresponding to the initial values $k_0$, the maximum values $k_A$ of the k values, and the efficiencies of electric power reception corresponding to the maximum values $k_A$, for example.

In step S17, the power transmitter 1 selects a group whose average value is smallest with respect to the change amounts $\Delta k$ of the k values for the respective groups obtained in step S16, and changes the k values of one or more power receivers 2 in the selected group.

Then, the power transmitter 1 transmits in step Ac, to the power receiver(s) 2 in the selected group, a command to change the k value to the k value obtained by decreasing the change amount $\Delta k$ from the maximum value $k_A$, and receives in step Bc, from the power receiver(s) 2, a signal that represents that the k value has been changed.

Note that in a case where a plurality of power receivers 2 are included in the selected group, the power transmitter 1 performs the process of step S17 and Ac for each of the power receivers 2, and as a result, the power transmitter 1 receives in step Bc, from each of the power receivers 2, a signal that represents that the k value has been changed.

As a result, the number of groups is reduced. The number of groups is reduced in order to reduce the total charging time. Note that in a case where a plurality of groups whose average value is smallest with respect to the change amounts $\Delta k$ for the respective groups are present in step S17, the k values may be changed for all the groups concerned, or the k values may be changed for at least one of the groups concerned.

Upon receiving the signals transmitted in step Bb from the respective power receivers 2, the power transmitter 1 calculates the total charging time $T_B$ corresponding to the k values, changed by decreasing the k values of the respective power receivers 2 from the maximum values $k_A$ by the change amounts $\Delta k$, in step S18.

The power transmitter 1 determines, with respect to the total charging times $T_0$ and $T_B$, whether $T_0 \geq T_B$ is satisfied in step S19.

Upon determining that $T_0 \geq T_B$ is not satisfied (NO in step S19), the power transmitter 1 causes the flow to return to step S16.

Then, the power transmitter 1 obtains, for respective groups of all the groups obtained, average values of change amounts $\Delta k$ by which the k values are to be changed from maximum values $k_A$ to move to groups of which levels of efficiencies of electric power reception are lower by two groups in step S16. At this time, the change amounts $\Delta k$ for changing from the maximum values $k_A$ to the upper limit values of the groups of which efficiencies of electric power reception are lower by two groups may be obtained.

In this way, in a case where $T_0 \geq T_B$ is not satisfied (NO in step S19) and the flow is returned to step S16, the level to be decreased in step S16 may be increased one by one for every time passing through the loop of steps S16 to S19.

That is, for the second loop of steps S16 to S19, the power transmitter 1 obtains, for the respective groups, the change amounts $\Delta k$ by which the k values are to be changed to move to the groups of which levels of efficiencies of electric power reception are lower by two groups. Further, for the third loop of steps S16 to S19, the power transmitter 1 obtains, for the respective groups, the change amounts $\Delta k$ by which the k values are to be changed to move to the groups of which levels of efficiencies of electric power reception are lower by three groups. Every time the number of times passing through the loop increases, the levels of the groups may be lowered one by one.

In this way, until satisfying $T_0 \geq T_B$ (YES in step S19), the process of steps S16 to S19 is repeatedly performed.

Upon determining that $T_0 \geq T_A$ is satisfied (YES in step S4), the power transmitter 1 causes the flow to proceed to step S5. Subsequently, the power transmitter 1 executes the process subsequent to step S5.

Figure 23:
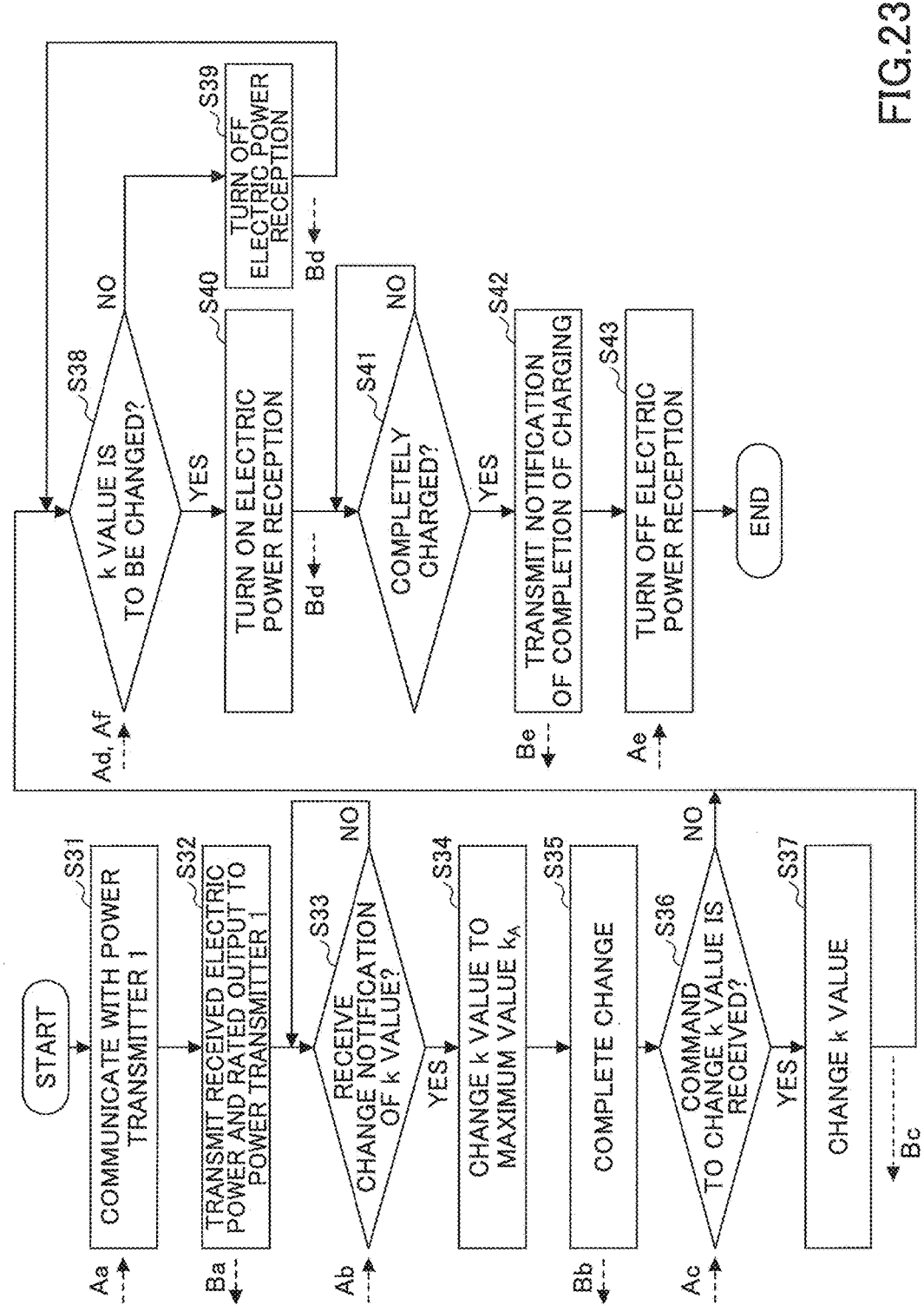
FIG. 23 is a flowchart illustrating control contents of each power receiver.

FIG. 23 is a flowchart illustrating control contents of each power receiver 2.

Upon entering an area in which electric power is receivable from the power transmitter 1, the power receiver 2 receives the electric power and communicates with the power transmitter 1 in step S31. At this time, the power receiver 2 receives the predetermined electric power for test electric power transmission from the power transmitter 1 in step Aa to measure the received electric power.

For example, the process of step S31 may be performed by a user of the power receiver 2 causing the power receiver 2 to approach the power transmitter 1 while turning on the electric power reception of the power receiver 2.

The power receiver 2 transmits, to the power transmitter 1 in step S32 and step Ba, data that represents the received electric power and the rated output.

The power receiver 2 determines whether a change notification of the k value has been received from the power transmitter 1 in step S33. The process of step S33 is repeatedly performed until receiving a change notification of the k value.

In step Ab, the change notification, which is for adjusting the adjustment unit 27 to change the k value to the maximum value, is transmitted from the power transmitter 1 to the power receiver 2. Upon determining that the change notification has been received (YES in step S33), the power receiver changes the k value to the maximum value $k_A$ in step S34. Upon receiving the change notification, the power receiver 2 adjusts the adjustment unit 27 to search for the angle of the adjustment unit 27 at which the received electric power becomes the maximum, and sets it to be the angle that gives the maximum received electric power. This is because the angle that gives the maximum received electric power is the angle at which the k value becomes the maximum value $k_A$.

Upon completing the setting to the maximum value $k_A$, the power receiver 2 transmits in step S35 and step Bb a signal that represents the completion of the setting.

The power receiver 2 determines whether a command to change the k value has been received from the power transmitter 1 in step S36. The process of step S36 is performed in a case where the power transmitter 1 performs the process of step S5 or step S17.

Accordingly, in step S36, the power receiver 2 determines whether the command to change the k value based on the process of step S5 or S17 of the power transmitter 1 has been received (step Ac). When the power transmitter 1 performs the process of step S5, the command received by the power receiver 2 in step S36 is a command to set the k value to be the maximum value $k_A$. When the power transmitter 1 performs the process of step 17, the command received by the power receiver 2 in step S36 is a command to set the k value to be the k value obtained by decreasing from the maximum value $k_A$ by the change amount $\Delta k$.

Upon determining that a command to change the k value has been received (YES in step S36), the power receiver 2 changes the k value in accordance with the command in step S37. Then, the power receiver 2 transmits, to the power transmitter 1 in step Bc, a signal that represents that the k value has been changed. Upon completing the process of step S37, the power receiver 2 causes the flow to proceed to step S38.

Upon determining that a command to change the k value has not been received (NO in step S36), the power receiver 2 causes the flow to proceed to step S38. Note that the case of not receiving from the power transmitter 1 a command to change the k value (NO in step S36) is a case where grouping is completed.

The power receiver 2 determines in step S38 whether its k value is to be changed. More specifically, the power receiver 2 determines whether the power receiver itself 2 is included in a group to be supplied with electric power.

The determination as to whether to be supplied with electric power may be made based on whether either a command to turn off the electric power reception based on the process of step Ad or a command to turn on the electric power reception based on the process of step Af has been received.

In a case of receiving a command to turn off the electric power reception, the power receiver 2 determines that the power receiver 2 itself is not to be supplied with electric power (NO in step S38), and turns off the electric power reception in step S39. For example, when the secondary-side resonant coil 21a includes the circuit configuration illustrated in FIG. 5A, the switch 213 may be turned off. The power receiver 2 transmits, to the power transmitter 1 in step Bd, a signal that represents that the electric power reception has been turned off.

Note that upon turning off the electric power reception in step S39, the power receiver returns the flow to step S38. This is for preparing a case where the power receiver 2 itself is to be supplied with electric power.

In a case of receiving a command to turn on the electric power reception, the power receiver 2 determines that the power receiver 2 itself is to be supplied with electric power (YES in step S38), and turns on the electric power reception in step S39. For example, when the secondary-side resonant coil 21a includes the circuit configuration illustrated in FIG. 5A, the switch 213 may be turned on. The power receiver 2 transmits, to the power transmitter 1 in step Bd, a signal that represents that the electric power reception has been turned on.

Upon the power transmitter 1 receiving, from all the power receivers 2, a signal based on step Bd representing that the electric power reception has been turned off and a signal based on step Bd representing that the electric power reception has been turned on, the power transmitter 1 starts to transmit electric power and charges one or more power receivers 2 whose electric power reception has been turned on.

The power receiver 2 determines in step S41 whether the charging has been completed. The power receiver 2 may determine whether the charging has been completed based on its rated output, the amount of electric power reception per unit time, and an elapsed time from starting of the charging. Upon determining that the charging has not been completed (NO in step S41), the power receiver 2 repeatedly performs the process of step S41 for each control cycle of the power receiver 2.

Upon determining that the charging has been completed (YES in step S41), the power receiver 2 transmits, to the power transmitter 1 in step S42 and step Be, a signal that represents the completion of the charging. As a result, the electric power reception of the power receiver 2 is turned off by the power transmitter 1 in step Ae.

Upon receiving the command to turn off the electric power reception from the power transmitter 1 in step Ae, the power receiver 2 turns off the electric power reception in step S43.

As described above, the charging of the power receiver 2 is completed. The power receiver 2 repeatedly executes the process of step S38 until the power receiver 2 itself is to be supplied with electric power. While the power receiver 2 repeatedly executes the process of step S38, the power transmitter 1 repeats the process of steps S7 to S17. Thereby, all the power receivers 2 are charged.

As described above, according to the embodiment, by performing grouping based on the kQ values, the total charging time for charging all power receivers 2 can be shortened.

Therefore, according to the embodiment, it is possible to provide the wireless power supply system, the power transmitter, and the power transmission method that can efficiently transmit electric power.

Figure 24:
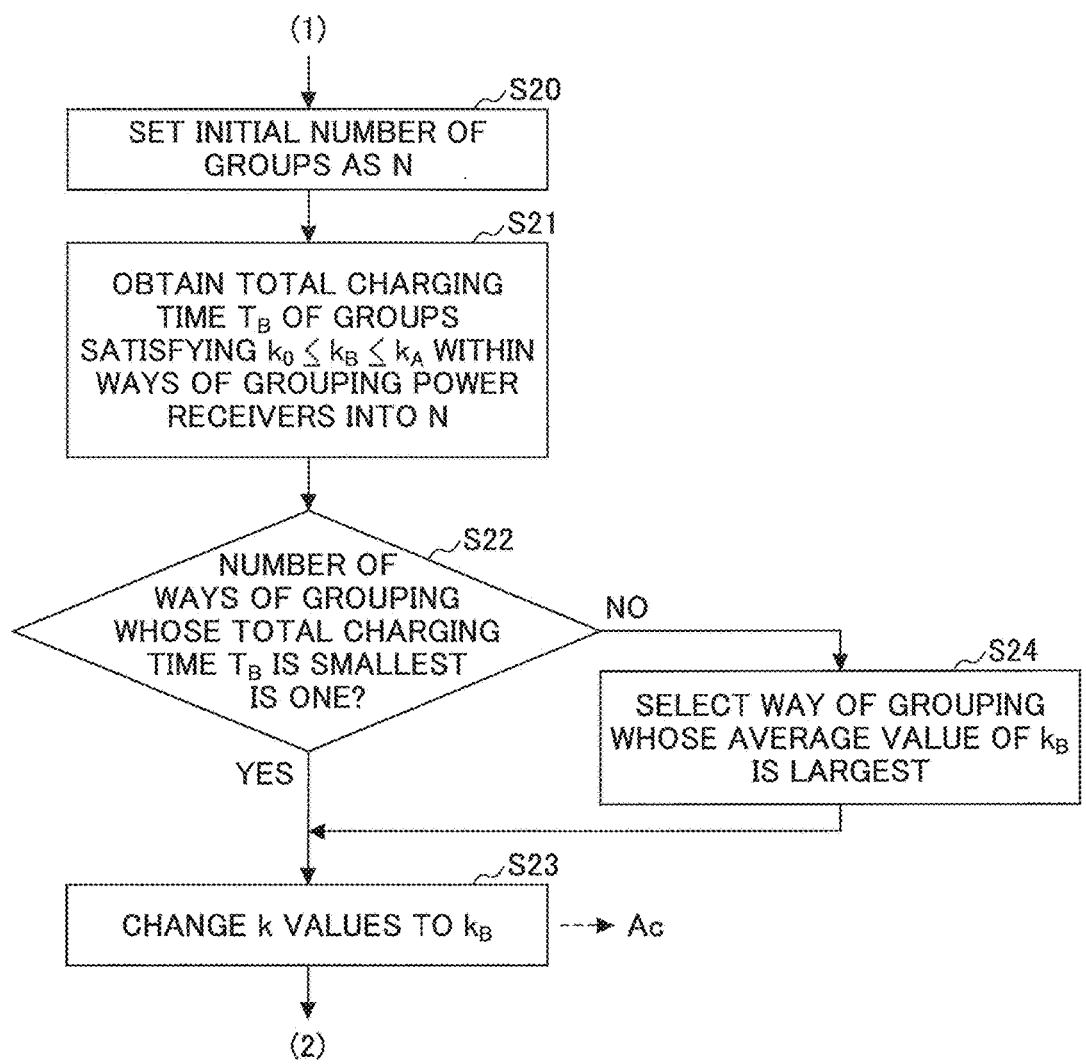
FIG. 24 is a flowchart illustrating control contents of the power transmitter according to a first variation example of the embodiment.
Figure 25:
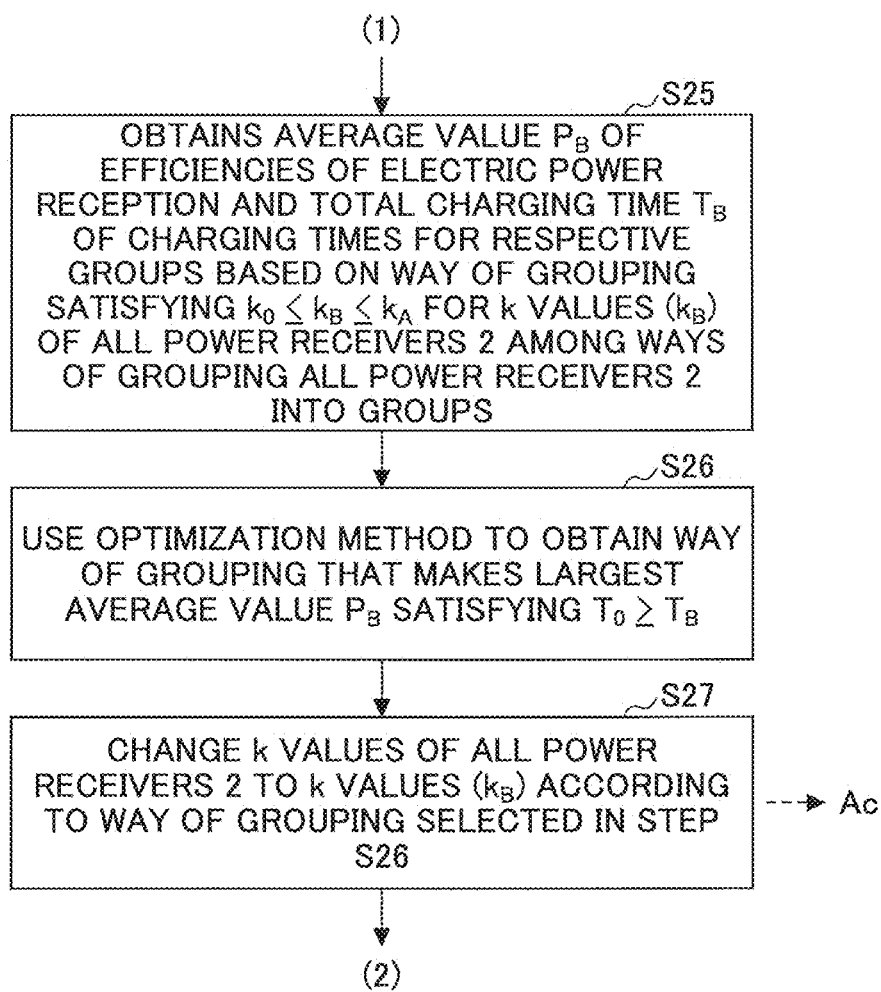
FIG. 25 is a flowchart illustrating control contents of the power transmitter according to a second variation example of the embodiment.

Note that a process of FIG. 24 or FIG. 25 may be performed instead of the process of the power transmitter 1 illustrated in FIG. 21.

FIG. 24 is a flowchart illustrating control contents of the power transmitter 1 according to a first variation example of the embodiment. The process of FIG. 24 is a process that may be performed when the number of groups grouped based on the maximum values $k_A$ in step S3 is greater than the initial number of groups grouped in step S1 and it is determined in step S4 that $T_0 \geq T_A$ is not satisfied.

First, the power transmitter 1 sets in step S20 the initial number of groups obtained by the grouping of step S1 as N.

The power transmitter 1 obtains in step S21 a total charging time $T_B$ of charging times for respective groups obtained by one or more ways of grouping satisfying $k_0 \leq k_B \leq k_A$ for the k values ($k_B$) of all the power receivers 2 among a plurality of ways of grouping all the power receivers 2 into N groups.

Here, in a case where there is a plurality of ways of grouping satisfying $k_0 \leq k_B \leq k_A$, charging times for respective groups obtained by each way of grouping are obtained and a total charging time $T_B$ is obtained as a total of the charging times of all the groups for each way of grouping. Accordingly, the number of total charging times $T_B$ obtained is equal to the number of ways of grouping satisfying $k_0 \leq k_B \leq k_A$.

The power transmitter 1 determines in step S22 whether the number of ways of grouping such that the total charging time $T_B$ is the smallest is one.

In a case where the number of ways of grouping is one (YES in step S22), the power transmitter 1 changes in step S23 the k values of all the power receivers 2 to $k_B$ obtained for the respective power receivers 2. Then, the power transmitter 1 transmits, to the power receivers 2 in the respective groups, commands to change the k values to $k_B$.

Note that because the k values ($k_B$) of the respective power receivers 2 may all differ, the k values ($k_B$) are obtained for the respective power receivers 2 in step S21 and set in step S23.

In a case of determining that the number of ways of grouping such that the total charging time is smallest is not one (NO in step S22), the power transmitter 1 selects in step S24, from among the plurality of ways of grouping such that the total charging time $T_B$ is smallest, a way of grouping whose average value of the k values ($k_B$) is largest.

Upon completing the process of step S24, the power transmitter 1 causes the flow to proceed to step S23, and changes in step S23 the k values of all the power receivers 2 to the k values ($k_B$) according to the way of grouping selected in step S24.

As described above, by performing grouping based on the kQ values, the total charging time for charging all the power receivers can be reduced.

Therefore, according to the embodiment, it is possible to provide the wireless power supply system, the power transmitter, and the power transmission method that can efficiently transmit electric power.

Although the embodiment in which the process illustrated in FIG. 24 is executed instead of the process of FIG. 21 is described here, the process illustrated in FIG. 24 may be performed when it is determined that $T_0 \geq T_B$ is not satisfied (NO in step S19 illustrated in FIG. 21), for example.

FIG. 25 is a flowchart illustrating control contents of the power transmitter 1 according to a second variation example of the embodiment. The process of FIG. 25 is a process that may be performed, instead of the process illustrated in FIG. 23, when it is determined in step S4 that $T_0 \geq T_A$ is not satisfied.

In step S25, the power transmitter 1 obtains an average value $P_B$ of efficiencies of electric power reception and a total charging time $T_B$ of charging times for respective groups based on a way of grouping satisfying $k_0 \leq k_B \leq k_A$ for the k values ($k_B$) of all the power receivers 2 among a plurality of ways of grouping all the power receivers 2 into a plurality of groups.

In step S26, the power transmitter 1 uses an optimization method to obtain the way of grouping that makes the largest average value $P_B$, which is the way of grouping satisfying $T_0 \geq T_B$ in the way of grouping obtained in step S25.

Here, as the way of grouping according to the optimization method, for example, a way of grouping may be performed using a metaheuristic (optimization method). Steps according to the metaheuristic are the following steps 1 to 5.

In step 1, based on the initial values $k_0$ and the maximum values $k_A$, groups to which corresponding power receivers 2 can belong are determined.

In step 2, total charging times are calculated for cases of all the ways of grouping.

In step 3, the way(s) of grouping whose total charging time is shortest is selected.

In step 4, when the number of ways of grouping whose total charging time is shortest is one, the one way of grouping is the solution.

In step 5, when there are two or more combinations whose total charging time is shortest, groups of which efficiency of electric power reception (average) are compared. Then, a combination, in which a group with a highest efficiency of electric power reception is present, may be the solution. Alternatively, a combination with the largest number of power receivers 2 belonging to a group of which efficiency of electric power reception is highest may be the solution.

Upon completing the process of step S26, the power transmitter 1 changes in step S27 the k values of all the power receivers 2 to the k values ($k_B$) according to the way of grouping selected in step S26. At this time, the power transmitter 1 transmits in step Ac, to the power receivers 2 in the respective groups, commands to change the k values to $k_B$.

As described above, by performing grouping based on the kQ values, the total charging time for charging all the power receivers can be reduced.

Therefore, according to the embodiment, it is possible to provide the wireless power supply system, the power transmitter, and the power transmission method that can efficiently transmit electric power.

Although the embodiment in which the process illustrated in FIG. 25 is executed instead of the process of FIG. 21 is described here, the process illustrated in FIG. 25 may be performed when it is determined that $T_0 \geq T_B$ is not satisfied (NO in step S19 illustrated in FIG. 21), for example.

Figure 26:
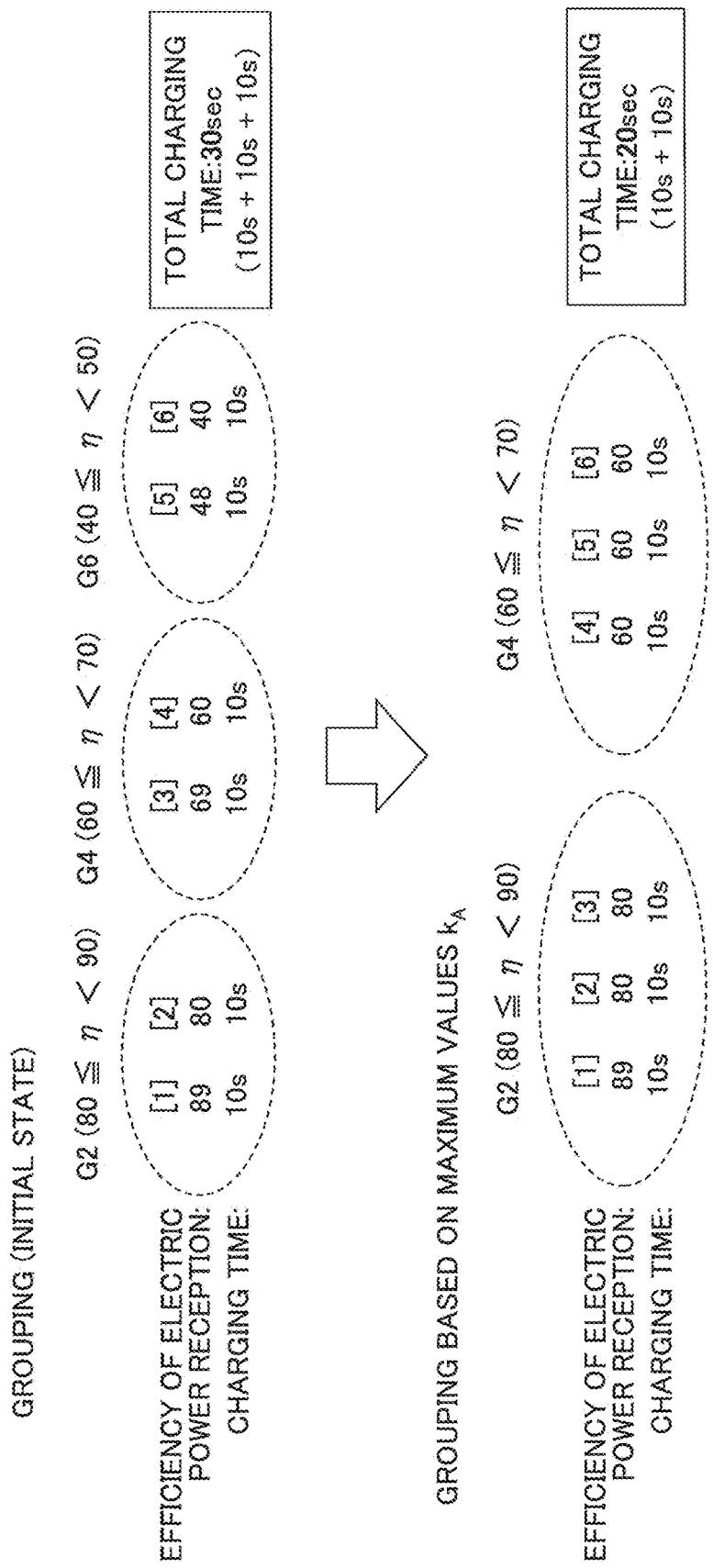
FIG. 26 is a diagram illustrating an example of grouping according to an electric power transmission method of the embodiment.

FIG. 26 is a diagram illustrating an example of grouping according to an electric power transmission method of the embodiment. The grouping described here is the process that is executed by the power transmitter 1 (see FIG. 17). Here, [1] to [6] indicate efficiencies of electric power reception and charging times of respective six power receivers 2 (see FIG. 17).

The group G2 is a group into which power receivers 2 of which efficiencies of electric power reception are greater than or equal to 80% and less than 90% are grouped. The group G4 is a group into which power receivers 2 of which efficiencies of electric power reception are greater than or equal to 60% and less than 70% are grouped. The group G6 is a group into which power receivers 2 of which efficiencies of electric power reception are greater than or equal to 40% and less than 50% are grouped.

First, the power transmitter 1 calculates initial values $k_0$ of the k values for the respective power receivers 2 and an initial value $T_0$ of the total charging time to group the power receivers 2 based on $k_0Q$ values. This corresponds to the process of step S1 illustrated in FIG. 20, and the power receivers 2 are grouped in an initial state based on the initial values $k_0$ of the k values and the initial time $T_0$ of the total charging time. Note that the data illustrated in FIG. 22 is used for the grouping.

In FIG. 26, the power receivers 2 corresponding to [1] and [2] are grouped into the group G2. The efficiency of electric power reception and the charging time of the power receiver 2 corresponding to [1] are 89% and 10 seconds (s). The efficiency of electric power reception and the charging time of the power receiver 2 corresponding to [2] are 80% and 10 seconds (s).

Further, the power receivers 2 corresponding to [3] and [4] are grouped into the group G4. The efficiency of electric power reception and the charging time of the power receiver 2 corresponding to [3] are 69% and 10 seconds (s). The efficiency of electric power reception and the charging time of the power receiver 2 corresponding to [4] are 60% and 10 seconds (s).

Further, the power receivers 2 corresponding to [5] and [6] are grouped into the group G6. The efficiency of electric power reception and the charging time of the power receiver 2 corresponding to [5] are 48% and 10 seconds (s). The efficiency of electric power reception and the charging time of the power receiver 2 corresponding to [6] are 40% and 10 seconds (s).

In such an initial state of grouping, the charging time of the group G2 is 10 seconds (s), the charging time of the group G4 is 10 seconds (s), and the charging time of the group G6 is 10 seconds (s). This is because the power receivers 2 are simultaneously charged in each group, and therefore the charging time for each group is determined depending on the longest charging time in the group.

Accordingly, a total charging time of the groups G2, G4, and G6 according to the initial state of grouping is 30 seconds (s).

Next, the power receivers 2 adjust the adjustment units 27 to change the k values to the maximum values, and the power transmitter 1 calculates the maximum values $k_A$ and the total charging time $T_A$ to group the power receivers 2 again. This corresponds to the process of steps S2 and S3 illustrated in FIG. 20.

Here, upon the k values being changed to the maximum values $k_A$, the efficiency of electric power reception and the charging time of the power receiver 2 corresponding to [1] become 89% and 10 seconds (s), and the efficiency of electric power reception and the charging time of the power receiver 2 corresponding to [2] become 80% and 10 seconds (s). That is, the efficiencies of electric power reception and the charging times of the power receivers 2 corresponding to [1] and [2] do not change from the initial state. This means that the maximum values $k_A$ have been obtained in the initial state.

Further, the efficiency of electric power reception and the charging time of the power receiver 2 corresponding to [3] become 80% and 10 seconds (s). That is, the efficiency of electric power reception increases.

Further, the efficiencies of electric power reception and the charging times of the power receivers 2 corresponding to [4], [5], and [6] all become 60% and 10 seconds (s). That is, the efficiencies of electric power reception increase.

As a result, according to the grouping based on the maximum values $k_A$, the power receivers 2 corresponding to [1], [2], and [3] are grouped into the group G2 and the power receivers 2 corresponding to [4], [5], and [6] are grouped into the group G4. Further, the charging times of the respective power receivers 2 are all 10 seconds.

According to the grouping based on the maximum values $k_A$ as described above, the charging time of the group G2 is 10 seconds (s) and the charging time of the group G4 is 10 seconds (s).

Accordingly, the total charging time $T_A$ of the groups G2 and G4 according to the grouping based on the maximum values $k_A$ is 20 seconds (s).

In this way, by increasing the k values from the initial values $k_0$ to the maximum values $k_A$, the total charging time is shortened from the initial value $T_0$, which is 30 seconds, to the total charging time $T_A$, which is 20 seconds.

FIG. 27 is a diagram illustrating an example of grouping according to an electric power transmission method of the embodiment.

First, the power transmitter 1 calculates initial values $k_0$ of the k values for the respective power receivers 2 and an initial value $T_0$ of the total charging time to group the power receivers 2 based on $k_0Q$ values. This corresponds to the process of step S1 illustrated in FIG. 20, and the power receivers 2 are grouped in an initial state based on the initial values $k_0$ of the k values and the initial time $T_0$ of the total charging time. Note that the data illustrated in FIG. 22 is used for the grouping.

In FIG. 27, the power receivers 2 corresponding to [1], [2], and [3] are grouped into the group G3. The efficiency of electric power reception and the charging time of the power receiver 2 corresponding to [1] are 70% and 10 seconds (s). The efficiency of electric power reception and the charging time of the power receiver 2 corresponding to [2] are 70% and 9 seconds (s). The efficiency of electric power reception and the charging time of the power receiver 2 corresponding to [3] are 70% and 8 seconds (s).

Further, the power receivers 2 corresponding to [4], [5], and [6] are grouped into the group G6. The efficiency of electric power reception and the charging time of the power receiver 2 corresponding to [4] are 40% and 10 seconds (s). The efficiency of electric power reception and the charging time of the power receiver 2 corresponding to [5] are 40% and 7 seconds (s). The efficiency of electric power reception and the charging time of the power receiver 2 corresponding to [6] are 49% and 7 seconds (s).

In such an initial state of grouping, the charging time of the group G3 is 10 seconds (s), and the charging time of the group G6 is 10 seconds (s). This is because the power receivers 2 are simultaneously charged in each group, and therefore the charging time for the group G3 is determined depending on the longest charging time of the power receiver 2 corresponding to [1], and the charging time for the group G6 is determined depending on the longest charging time of the power receiver 2 corresponding to [4].

Accordingly, a total charging time of the groups G3 and G6 according to the initial state of grouping is 20 seconds (s).

Next, the power receivers 2 adjust the adjustment units 27 to change the k values to the maximum values, and the power transmitter 1 calculates the maximum values $k_A$ and the total charging time $T_A$ to group the power receivers 2 again. This corresponds to the process of steps S2 and S3 illustrated in FIG. 20.

Here, upon the k values being changed to the maximum values $k_A$, the efficiency of electric power reception and the charging time of the power receiver 2 corresponding to [1] become 80% and 10 seconds (s), the efficiency of electric power reception and the charging time of the power receiver 2 corresponding to [2] become 80% and 9 seconds (s), and the efficiency of electric power reception and the charging time of the power receiver 2 corresponding to [3] become 70% and 8 seconds (s).

Further, the efficiency of electric power reception and the charging time of the power receiver 2 corresponding to [4] become 70% and 10 seconds (s), and the efficiency of electric power reception and the charging time of the power receiver 2 corresponding to [5] become 50% and 7 seconds (s).

Further, the efficiency of electric power reception and the charging time of the power receiver 2 corresponding to [6] become 80% and 7 seconds (s).

As a result, according to the grouping based on the maximum values $k_A$, the power receivers 2 corresponding to [1], [2], and [6] are grouped into the group G2, the power receivers 2 corresponding to [3] and [4] are grouped into the group G3, and the power receiver 2 corresponding to [5] is grouped into the group G5.

According to the grouping based on the maximum values $k_A$ as described above, the charging time of the group G2 is 10 seconds (s), the charging time of the group G3 is 10 seconds (s), and the charging time of the group G5 is 7 seconds (s). This is because the charging time for each group is determined depending on the longest charging time in the group.

Accordingly, the total charging time $T_A$ of the groups G2, G3, and G5 according to the grouping based on the maximum values $k_A$ is 27 seconds (s).

In the case illustrated in FIG. 27, by increasing the k values from the initial values $k_0$ to the maximum values $k_A$, the total charging time is extended from the initial value $T_0$, which is 20 seconds, to the total charging time $T_A$, which is 27 seconds. This corresponds to a case where it has been determined that $T_0 \geq T_A$ is not satisfied (NO in step S4).

In such a case, for example, the process illustrated in FIG. 24 may be executed to shorten the total charging time by returning the number of groups to the number of groups in the initial state. As a result of executing the process illustrated in FIG. 24, the efficiency of electric power reception and the charging time of the power receiver 2 corresponding to [1] become 79% and 10 seconds (s), the efficiency of electric power reception and the charging time of the power receiver 2 corresponding to [2] become 79% and 9 seconds (s), and the efficiency of electric power reception and the charging time of the power receiver 2 corresponding to [3] become 70% and 8 seconds (s).

Further, the efficiency of electric power reception and the charging time of the power receiver 2 corresponding to [4] become 70% and 10 seconds (s), and the efficiency of electric power reception and the charging time of the power receiver 2 corresponding to [5] become 50% and 7 seconds (s).

Further, the efficiency of electric power reception and the charging time of the power receiver 2 corresponding to [6] become 79% and 7 seconds (s).

As a result, according to the grouping based on the process illustrated in FIG. 24, the power receivers 2 corresponding to [1], [2], [3], [4], and [6] are grouped into the group G3 and the power receiver 2 corresponding to [5] is grouped into the group G5.

According to the grouping as described above, the charging time of the group G3 is 10 seconds (s), and the charging time of the group G5 is 7 seconds (s).

Accordingly, the total charging time of the groups G3 and G5 according to the grouping based on the process illustrated in FIG. 24 is 17 seconds (s).

In this way, by performing the grouping according to the process illustrated in FIG. 24, the total charging time is shortened from the initial value $T_0$ (20 seconds) to 17 seconds.

Note that the process of grouping according to the process illustrated in FIG. 24 from the grouping according to the maximum values $k_A$ illustrated in FIG. 27 can be treated as the process of grouping according to the process illustrated in FIG. 21 from the grouping according to the maximum values $k_A$.

FIG. 28 is a diagram illustrating all the ways of grouping when the power receivers 2 are grouped again through the process of FIG. 24 from the grouping based on the maximum values $k_A$ of FIG. 27.

As illustrated in FIG. 27, at the maximum values $k_A$, the efficiencies of electric power reception of the six power receivers 2 corresponding to [1], [2], [3], [4], [5], and [6] are respectively 80%, 80%, 70%, 70%, 50%, and 80%.

Because the six power receivers 2 are grouped into three groups, combinations for changing the k values are considered in order to return, through the process of FIG. 24, to two groups that is the number of groups in the initial state.

As the ways of grouping the six power receivers 2, corresponding to [1], [2], [3], [4], [5], and [6] and having the efficiencies of electric power reception at the maximum values $k_A$ as described above, into two groups 1 and 2, 31 combinations No. 1 to No. 31 illustrated in FIG. 28 are considered.

According to four combinations No. 5, No. 19, No. 21, and No. 22 among the 31 combinations, the six power receivers 2 can be grouped into two groups by changing the k value of one or more power receivers 2 of the six power receivers 2. In FIG. 28, "0" is indicated for No. 5, No. 19, No. 21, and No. 22 because they can be established. In FIG. 28, "x" is indicated for combinations that cannot be established.

When No. 5, No. 19, No. 21, and No. 22 are realized, the total charging times $T_B$ obtained in the process of step S21 are respectively 17 seconds, 20 seconds, 17 seconds, and 20 seconds.

Accordingly, there are two combinations No. 5 and No. 22 as combinations of which the total charging time $T_B$ is shortest, and "NO" is made in the determination process of step S22.

Then, in step S23, a combination is selected of which $k_BQ$ is higher among the two combinations No. 5 and No. 21.

Here, for the combination of No. 5, the k value of only the power receiver 2 corresponding to [4] may be adjusted. More specifically, the efficiency of electric power reception of the power receiver 2 corresponding to [4] may be decreased from 80% to 70%.

With respect to the above, for the combination of No. 21, the k values of the power receivers 2 corresponding to [4] and [5] are required to be adjusted. More specifically, the efficiencies of electric power reception of the power receivers 2 corresponding to [4] and [5] are required to be decreased from 80% to 79%.

Hence, in step S23, the combination of No. 5 is selected as the higher $k_BQ$ among the two combinations No. 5 and No. 21.

FIG. 29 is a diagram illustrating an example of grouping according to an electric power transmission method of the embodiment.

First, the power transmitter 1 calculates initial values $k_0$ of the k values for the respective power receivers 2 and an initial value $T_0$ of the total charging time to group the power receivers 2 based on $k_0Q$ values. This corresponds to the process of step S1 illustrated in FIG. 20, and the power receivers 2 are grouped in an initial state based on the initial values $k_0$ of the k values and the initial time $T_0$ of the total charging time. Note that the data illustrated in FIG. 22 is used for the grouping.

In FIG. 27, the power receivers 2 corresponding to [1], [2], and [3] are grouped into the group G3. The efficiency of electric power reception and the charging time of the power receiver 2 corresponding to [1] are 70% and 10 seconds (s). The efficiency of electric power reception and the charging time of the power receiver 2 corresponding to [2] are 70% and 9 seconds (s). The efficiency of electric power reception and the charging time of the power receiver 2 corresponding to [3] are 70% and 8 seconds (s).

Further, the power receivers 2 corresponding to [4], [5], and [6] are grouped into the group G6. The efficiency of electric power reception and the charging time of the power receiver 2 corresponding to [4] are 40% and 10 seconds (s). The efficiency of electric power reception and the charging time of the power receiver 2 corresponding to [5] are 40% and 7 seconds (s). The efficiency of electric power reception and the charging time of the power receiver 2 corresponding to [6] are 45% and 7 seconds (s).

In such an initial state of grouping, the charging time of the group G3 is 10 seconds (s), and the charging time of the group G6 is 10 seconds (s).

Accordingly, a total charging time of the groups G3 and G6 according to the initial state of grouping is 20 seconds (s).

Next, the power receivers 2 adjust the adjustment units 27 to change the k values to the maximum values, and the power transmitter 1 calculates the maximum values $k_A$ and the total charging time $T_A$ to group the power receivers 2 again. This corresponds to the process of steps S2 and S3 illustrated in FIG. 20.

Here, upon the k values being changed to the maximum values $k_A$, the efficiency of electric power reception and the charging time of the power receiver 2 corresponding to [1] become 80% and 10 seconds (s), the efficiency of electric power reception and the charging time of the power receiver 2 corresponding to [2] become 80% and 9 seconds (s), and the efficiency of electric power reception and the charging time of the power receiver 2 corresponding to [3] become 71% and 8 seconds (s).

Further, the efficiency of electric power reception and the charging time of the power receiver 2 corresponding to [4] become 70% and 10 seconds (s), and the efficiency of electric power reception and the charging time of the power receiver 2 corresponding to [5] become 50% and 7 seconds (s).

Further, the efficiency of electric power reception and the charging time of the power receiver 2 corresponding to [6] become 80% and 7 seconds (s).

As a result, according to the grouping based on the maximum values $k_A$, the power receivers 2 corresponding to [1], [2], and [6] are grouped into the group G2, the power receivers 2 corresponding to [3] and [4] are grouped into the group G3, and the power receiver 2 corresponding to [5] is grouped into the group G5.

According to the grouping based on the maximum values $k_A$ as described above, the charging time of the group G2 is 10 seconds (s), the charging time of the group G3 is 10 seconds (s), and the charging time of the group G5 is 7 seconds (s). This is because the charging time for each group is determined depending on the longest charging time in the group.

Accordingly, the total charging time $T_A$ of the groups G2, G3, and G5 according to the grouping based on the maximum values $k_A$ is 27 seconds (s).

In the case illustrated in FIG. 29, by increasing the k values from the initial values $k_0$ to the maximum values $k_A$, the total charging time is extended from the initial value $T_0$, which is 20 seconds, to the total charging time $T_A$, which is 27 seconds. This corresponds to a case where it has been determined that $T_0 \geq T_A$ is not satisfied (NO in step S4).

In such a case, when the power receivers 2 are grouped based on the optimization process illustrated in FIG. 24, the efficiency of electric power reception and the charging time of the power receiver 2 corresponding to [1] become 79% and 10 seconds (s), the efficiency of electric power reception and the charging time of the power receiver 2 corresponding to [2] become 79% and 9 seconds (s), and the efficiency of electric power reception and the charging time of the power receiver 2 corresponding to [3] become 71% and 8 seconds (s).

Further, the efficiency of electric power reception and the charging time of the power receiver 2 corresponding to [4] become 70% and 10 seconds (s), and the efficiency of electric power reception and the charging time of the power receiver 2 corresponding to [5] become 50% and 7 seconds (s).

Further, the efficiency of electric power reception and the charging time of the power receiver 2 corresponding to [6] become 79% and 7 seconds (s).

As a result, according to the grouping based on the optimization process illustrated in FIG. 24, the power receivers 2 corresponding to [1], [2], [3], [4], and [6] are grouped into the group G3 and the power receiver 2 corresponding to [5] is grouped into the group G5.

According to the grouping based on the optimization process as described above, the charging time of the group G3 is 10 seconds (s), and the charging time of the group G5 is 7 seconds (s).

Accordingly, the total charging time of the groups G3 and G5 according to the grouping based on the optimization process illustrated in FIG. 24 is 17 seconds (s).

In this way, by performing the grouping according to the optimization, the total charging time is shortened from the initial value $T_0$ (20 seconds) to 17 seconds.

FIGS. 30A to 30C are diagrams illustrating a power receiver 2 according to a variation example of the embodiment.

The power receiver 2 illustrated in FIGS. 30A to 30C has a configuration in which a power extraction coil 21b is added to the power receiver 2 illustrated in FIG. 18. The power extraction coil 21b receives electric power, through electromagnetic induction, received by the secondary-side resonant coil 21a from the primary-side resonant coil 11a of the power transmitter 1 through magnetic field resonance. Accordingly, in FIGS. 30A to 30C, the secondary-side resonant coil 21a serves as a relay coil. Note that a resonant coil that receives electric power through magnetic field resonance similar to the secondary-side resonant coil 21a may be used instead of the power extraction coil 21b as an electromagnetic induction coil.

The power receiver 2 illustrated in FIGS. 30A to 30C can more easily receive electric power transmitted from the power transmitter 1 by using the secondary-side resonant coil 21a serving as a relay coil.

Figure 31A:
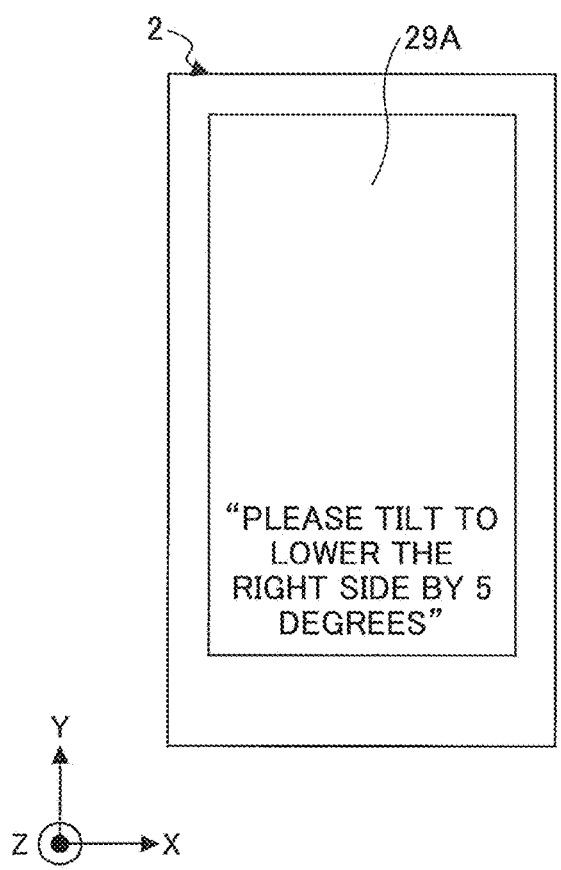
FIGS. 31A and 31B are diagrams illustrating a power receiver according to a variation example of the embodiment.
Figure 31B:
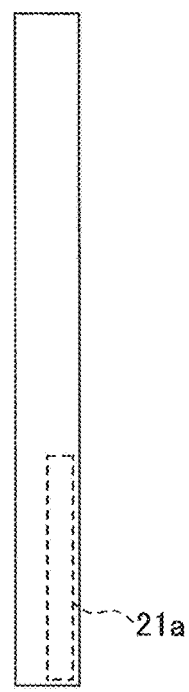

FIGS. 31A and 31B are diagrams illustrating a power receiver 2 according to a variation example of the embodiment.

The power receiver 2 illustrated in FIGS. 31A and 31B is a smartphone terminal device having a configuration, where the secondary-side resonant coil 21a of the power receiver 2 illustrated in FIG. 18 is internally contained and the adjustment unit 27 is omitted. Upon receiving an adjustment control signal for the k value from the power transmitter 1, the power receiver 2 illustrated in FIG. 18 converts the adjustment amount, which is based on the adjustment control signal, into a three-dimensional angle value and displays the adjustment amount of the angle on a display 29A.

In FIGS. 31A and 31B, a message "PLEASE TILT TO LOWER THE RIGHT SIDE BY 5 DEGREES" is displayed on the display 29A. A user of the power receiver 2 adjusts the angle of the power receiver 2 according to the message displayed on the display 29A. Thereby, the k value is increased and the efficiency of electric power reception of the power receiver 2 is increased. Power receivers 2 as illustrated in FIGS. 31A and 31B may be used instead of the power receivers 2 as illustrated in FIG. 18 to adjust k values as illustrated in FIGS. 20, 21, 23, 24, and 25.

Figure 32:
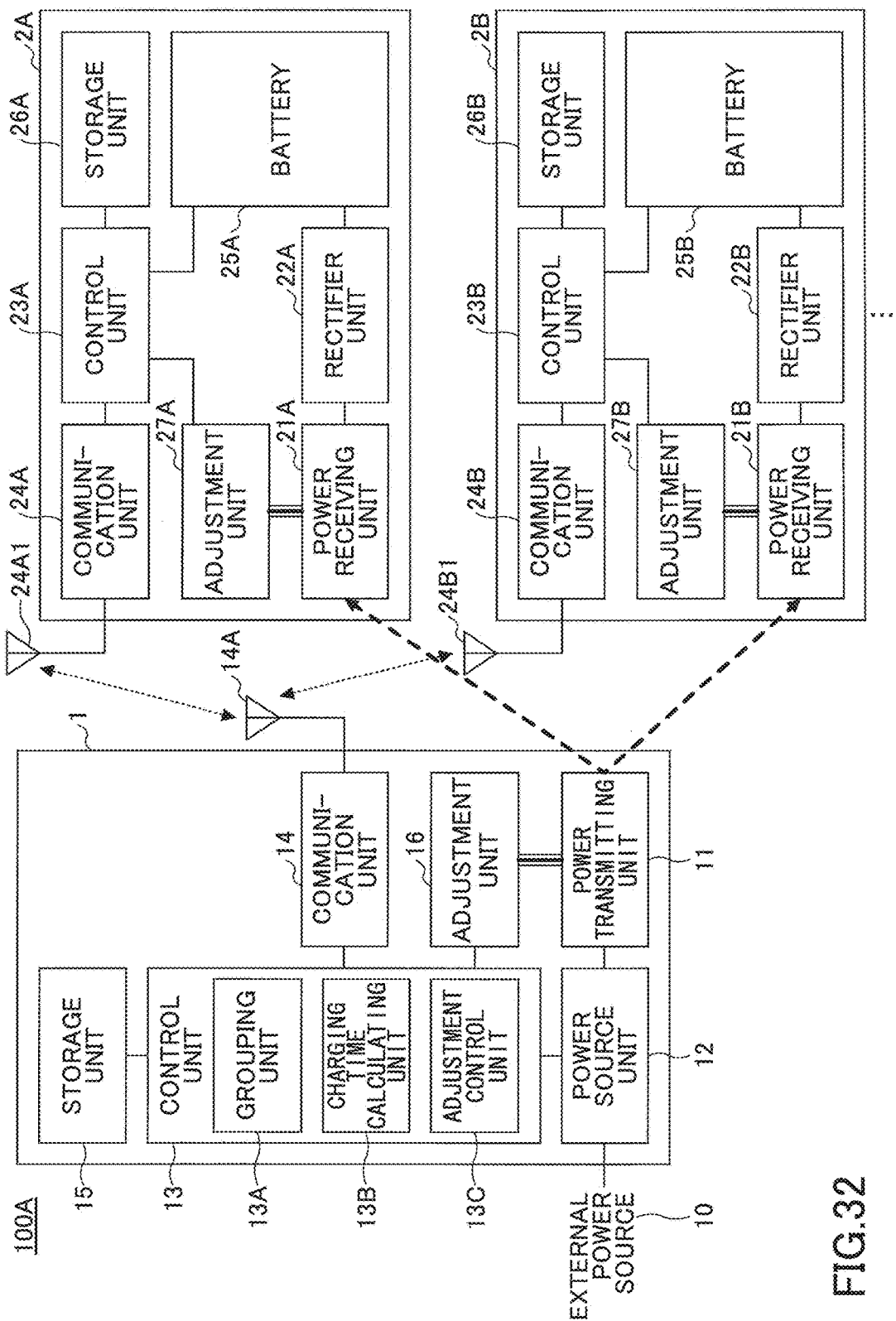
FIG. 32 is a diagram illustrating a wireless power supply system according to a variation example of the embodiment.

FIG. 32 is a diagram illustrating a wireless power supply system 100A according to a variation example of the embodiment.

The wireless power supply system 100A has a configuration in which an adjustment unit 16 is added to the power transmitter 1 of the wireless power supply system 100 illustrated in FIG. 17. The adjustment unit 16 is provided in order to adjust, with respect to the power transmitter 1, an angle of the primary-side resonant coil 11a.

When the coupling coefficients (k values) between the power transmitter 1 and the power receivers 2A and 2B are adjusted, the adjustment unit 16 of the power transmitter 1 may be adjusted in addition to adjusting the adjustment units 27 of the power receivers 2A and 2B or instead of adjusting the adjustment units 27 of the power receivers 2A and 2B.

Although examples of the wireless power supply system, the power transmitter, and the power transmission method according to the embodiment of the present invention have been described above, the present invention is not limited to the embodiment specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless power supply system comprising:
   a power transmitter including a primary-side resonant coil and configured to transmit electric power; and
   a plurality of power receivers including secondary-side resonant coils configured to receive the electric power from the primary-side resonant coil through magnetic field resonance or electric field resonance generated with the primary-side resonant coil,
   wherein the power transmitter groups the plurality of power receivers into a plurality of first groups based on degrees of coupling between the power transmitter and the respective power receivers in an initial state,
   wherein the power transmitter calculates, for the respective first groups, charging times required to charge all the power receivers, and calculates a first total charging time obtained by totaling the charging times for all the first groups,
   wherein the power transmitter sets, to the power receivers, degrees of coupling that are greater than or equal to the degrees of coupling in the initial state,
   wherein the power transmitter again groups the plurality of power receivers into a plurality of second groups based on the set degrees of coupling,
   wherein the power transmitter calculates, for the respective second groups, charging times required to charge all the power receivers, and calculates a second total charging time obtained by totaling the charging times for the second groups, and
   wherein the power transmitter starts to transmit the electric power when the second total charging time is less than or equal to the first total charging time.

2. The wireless power supply system according to claim 1, wherein the power transmitter obtains the degrees of coupling based on received electric power of the respective power receivers.

3. The wireless power supply system according to claim 1,
   wherein the power receivers include adjustment units configured to adjust the degrees of coupling with the power transmitter, and
   wherein the power transmitter causes the adjustment units to set the degrees of coupling that are greater than or equal to the degrees of coupling in the initial state.

4. The wireless power supply system according to claim 3, wherein the power transmitter adjusts the adjustment units such that the degrees of coupling become maximums.

5. The wireless power supply system according to claim 3, wherein the adjustment units adjusts angles of the secondary-side resonant coils with respect to the power receivers.

6. The wireless power supply system according to claim 1,
   wherein the power transmitter groups the plurality of power receivers by separating the degrees of coupling for respective predetermined ranges, wherein, when the second total charging time is longer than the first total charging time, the power transmitter generates a plurality of third groups by moving a second group, whose change amount of the degrees of coupling for moving to a second group one level below is smallest among the plurality of second groups, to the second group one level below, a number of the third groups being less than a number of the second groups, wherein the power transmitter calculates a third total charging time obtained by totaling charging times for all the third groups, and wherein the power transmitter starts to transmit the electric power when the third total charging time is less than or equal to the first total charging time.

7. The wireless power supply system according to claim 1, wherein, when the second total charging time is longer than the first total charging time and a number of the second groups is greater than a number of the first groups, the power transmitter groups the plurality of power receivers into a plurality of third groups obtained by degrees of coupling, which are greater than or equal to the degrees of coupling in the initial state and less than or equal to the set degrees of coupling, to start to transmit the electric power, a total charging time for the third groups being shortest among third groups whose number of groups is equal to the number of the first groups.

8. The wireless power supply system according to claim 1, wherein, when the second total charging time is longer than the first total charging time, the power transmitter groups the plurality of power receivers into a plurality of third groups obtained by degrees of coupling, which are greater than or equal to the degrees of coupling in the initial state and less than or equal to the set degrees of coupling, to start to transmit the electric power, an average degree of coupling for the third groups being largest.

9. The wireless power supply system according to claim 6, wherein, when the third total charging time is longer than the first total charging time and a number of the third groups is greater than a number of the first groups, the power transmitter groups the plurality of power receivers into a plurality of fourth groups obtained by degrees of coupling, which are greater than or equal to the degrees of coupling in the initial state and less than or equal to the set degrees of coupling, to start to transmit the electric power, a total charging time for the fourth groups being shortest among fourth groups whose number of groups is equal to the number of the first groups.

10. The wireless power supply system according to claim 6, wherein, when the third total charging time is longer than the first total charging time, the power transmitter groups the plurality of power receivers into a plurality of fourth groups obtained by degrees of coupling, which are greater than or equal to the degrees of coupling in the initial state and less than or equal to the set degrees of coupling, to start to transmit the electric power, an average degree of coupling for the fourth groups being largest.

11. The wireless power supply system according to claim 10, wherein the power receivers further include resonant coils configured to receive the electric power through magnetic field resonance or electric field resonance generated with the secondary-side resonant coils or include induction coils configured to receive the electric power through electromagnetic induction from the secondary-side resonant coils.

12. A power transmitter, including a primary-side resonant coil, for transmitting electric power to a plurality of power receivers including secondary-side resonant coils configured to receive the electric power from the primary-side resonant coil through magnetic field resonance or electric field resonance generated with the primary-side resonant coil, wherein the power transmitter groups the plurality of power receivers into a plurality of first groups based on degrees of coupling between the power transmitter and the respective power receivers in an initial state, wherein the power transmitter calculates, for the respective first groups, charging times required to charge all the power receivers, and calculates a first total charging time obtained by totaling the charging times for all the first groups, wherein the power transmitter sets, to the power receivers, degrees of coupling that are greater than or equal to the degrees of coupling in the initial state, wherein the power transmitter again groups the plurality of power receivers into a plurality of second groups based on the set degrees of coupling, wherein the power transmitter calculates, for the respective second groups, charging times required to charge all the power receivers, and calculates a second total charging time obtained by totaling the charging times for the second groups, and wherein the power transmitter starts to transmit the electric power when the second total charging time is less than or equal to the first total charging time.

13. A power transmission method in a wireless power supply system, the wireless power supply system including a power transmitter including a primary-side resonant coil and configured to transmit electric power; and a plurality of power receivers including secondary-side resonant coils configured to receive the electric power from the primary-side resonant coil through magnetic field resonance or electric field resonance generated with the primary-side resonant coil, the power receivers including adjustment units configured to adjust degrees of coupling with the power transmitter, the power transmission method comprising:

causing the power transmitter to group the plurality of power receivers into a plurality of first groups based on degrees of coupling between the power transmitter and the respective power receivers in an initial state;

causing the power transmitter to calculate, for the respective first groups, charging times required to charge all the power receivers, and to calculate a first total charging time obtained by totaling the charging times for all the first groups;

causing the power transmitter to adjust the adjustment units to set the degrees of coupling that are greater than or equal to the degrees of coupling in the initial state;

causing the power transmitter to again group the plurality of power receivers into a plurality of second groups based on the set degrees of coupling;

causing the power transmitter to calculate, for the respective second groups, charging times required to charge all the power receivers, and to calculate a second total charging time obtained by totaling the charging times for the second groups; and causing the power transmitter to start to transmit the electric power when the second total charging time is less than or equal to the first total charging time.

* * * * *